(12) United States Patent
Tsuji et al.

(10) Patent No.: US 8,335,612 B2
(45) Date of Patent: Dec. 18, 2012

(54) FALLING PREVENTION CONTROLLING DEVICE AND COMPUTER PROGRAM

(75) Inventors: Shigeru Tsuji, Nagaokakyo (JP);
Shigeki Fukunaga, Nagaokakyo (JP);
Mitsuhiro Namura, Nagaokakyo (JP);
Koji Kawai, Nagaokakyo (JP); Kenichi Shirato, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 1 day.

(21) Appl. No.: 13/048,124

(22) Filed: Mar. 15, 2011

(65) Prior Publication Data

US 2011/0166713 A1    Jul. 7, 2011

Related U.S. Application Data

(63) Continuation of application No. PCT/JP2009/053354, filed on Feb. 25, 2009.

(30) Foreign Application Priority Data

Sep. 17, 2008   (JP) ................................ 2008-237483

(51) Int. Cl.
*B62D 6/00*   (2006.01)
(52) U.S. Cl. ............. 701/41; 701/42; 180/10; 180/19.2; 180/21; 180/171
(58) Field of Classification Search .................. 700/279; 701/124, 41, 42; 180/10, 19.2, 21, 171
See application file for complete search history.

(56) References Cited

U.S. PATENT DOCUMENTS

| 3,260,324 | A | * | 7/1966 | Suarez | 180/10 |
| 4,716,980 | A | * | 1/1988 | Butler | 180/19.2 |
| 4,874,055 | A | * | 10/1989 | Beer | 180/19.2 |
| 5,314,034 | A | * | 5/1994 | Chittal | 180/21 |
| 6,003,624 | A | * | 12/1999 | Jorgensen et al. | 180/6.5 |
| 6,302,230 | B1 | * | 10/2001 | Kamen et al. | 180/171 |
| 6,367,817 | B1 | * | 4/2002 | Kamen et al. | 280/5.507 |

(Continued)

FOREIGN PATENT DOCUMENTS

JP    2004-276727 A    10/2004
(Continued)

OTHER PUBLICATIONS

Official Communication issued in International Patent Application No. PCT/JP2009/053354, mailed on Jun. 9, 2009.

*Primary Examiner* — Thomas Black
*Assistant Examiner* — Wae Louie
(74) *Attorney, Agent, or Firm* — Keating & Bennett, LLP

(57) ABSTRACT

A falling prevention controlling device includes a wheel, and a main body arranged to swing in a pitch direction and a roll direction above the wheel, an advance/retreat command receiving unit arranged to receive an advance or a retreat command of the wheel, a target pitch angle calculating unit arranged to calculate a target pitch angle based on the received command and a rotation velocity deviation in the pitch direction derived from the detected rotation angle, a pitch inclined angle estimating unit arranged to estimate a pitch inclined angle with respect to a balanced state, from the detected pitch angular velocity and a pitch torque command generated based on the target pitch angle, and a pitch torque command generating unit arranged to generate the pitch torque command based on the target pitch angle and the pitch inclined angle.

12 Claims, 14 Drawing Sheets

U.S. PATENT DOCUMENTS

| | | | |
|---|---|---|---|
| 6,651,763 B1 * | 11/2003 | Kamen et al. | 180/171 |
| 7,178,614 B2 * | 2/2007 | Ishii | 180/7.1 |
| 7,798,510 B2 * | 9/2010 | Comstock et al. | 280/266 |
| 7,823,676 B2 * | 11/2010 | Yamada et al. | 180/218 |
| 7,963,352 B2 * | 6/2011 | Alexander | 180/21 |
| 2002/0063006 A1 * | 5/2002 | Kamen et al. | 180/171 |
| 2004/0055804 A1 * | 3/2004 | Kamen et al. | 180/271 |
| 2005/0121866 A1 * | 6/2005 | Kamen et al. | 280/47.18 |
| 2006/0061460 A1 * | 3/2006 | Kamen et al. | 340/427 |
| 2007/0296170 A1 * | 12/2007 | Field et al. | 280/47.131 |
| 2008/0018443 A1 * | 1/2008 | Kamen et al. | 340/439 |
| 2008/0228357 A1 | 9/2008 | Hirata | |
| 2009/0030597 A1 | 1/2009 | Fuwa et al. | |
| 2009/0138232 A1 | 5/2009 | Fuwa et al. | |
| 2011/0010013 A1 * | 1/2011 | Ruan et al. | 700/261 |
| 2011/0166713 A1 * | 7/2011 | Tsuji et al. | 700/279 |
| 2011/0191013 A1 * | 8/2011 | Leeser | 701/124 |
| 2012/0010783 A1 * | 1/2012 | Tsuji et al. | 701/42 |

FOREIGN PATENT DOCUMENTS

| | | |
|---|---|---|
| JP | 2008-089531 A | 4/2008 |
| WO | 2007/001083 A1 | 1/2007 |
| WO | 2007/063665 A1 | 6/2007 |

* cited by examiner

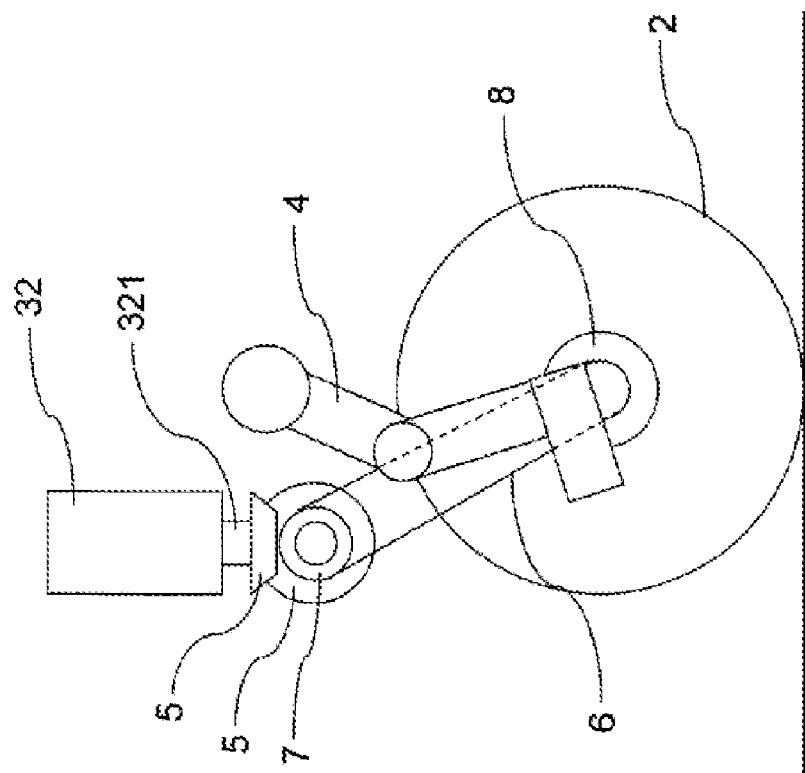
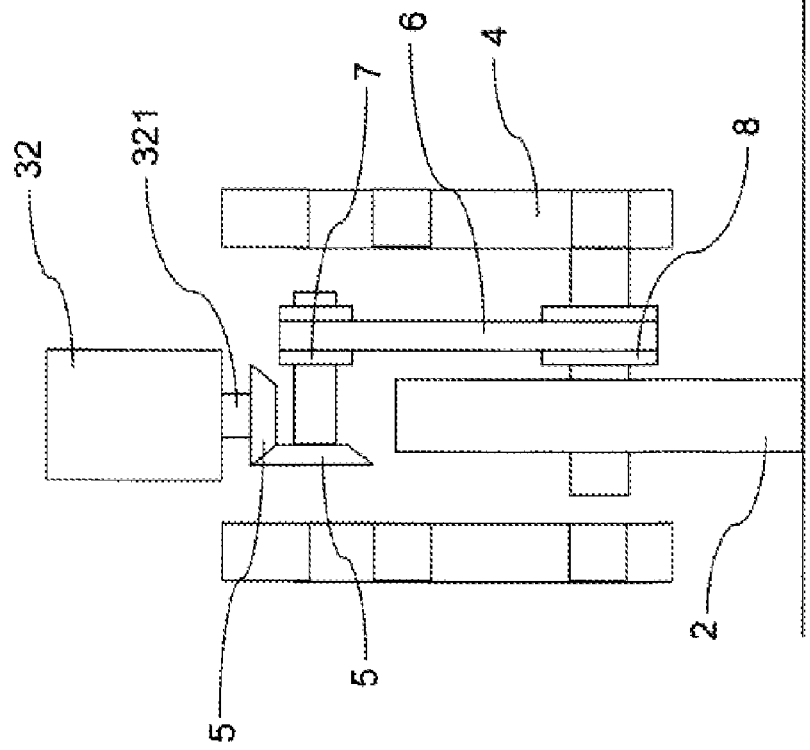

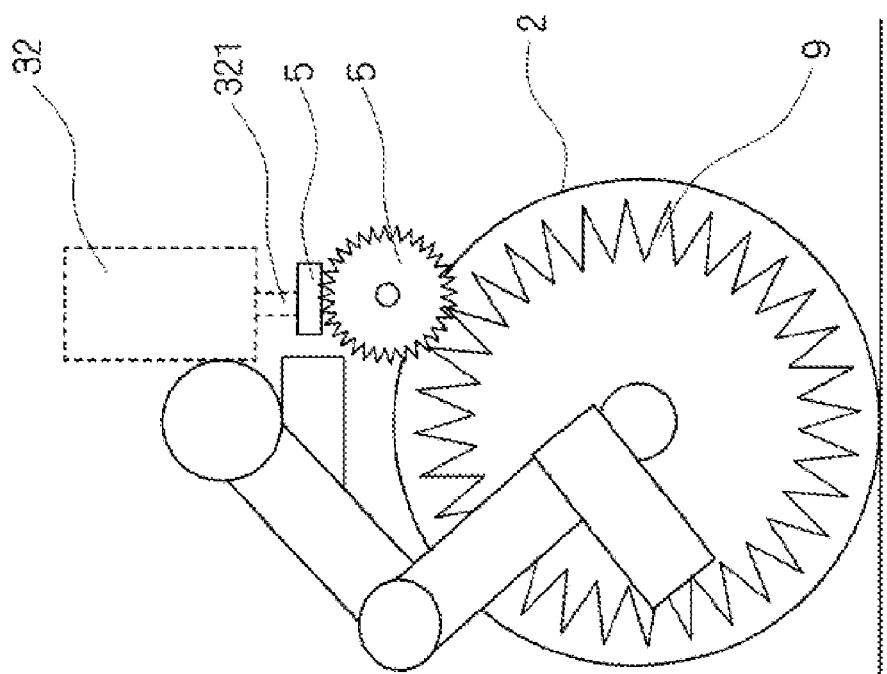
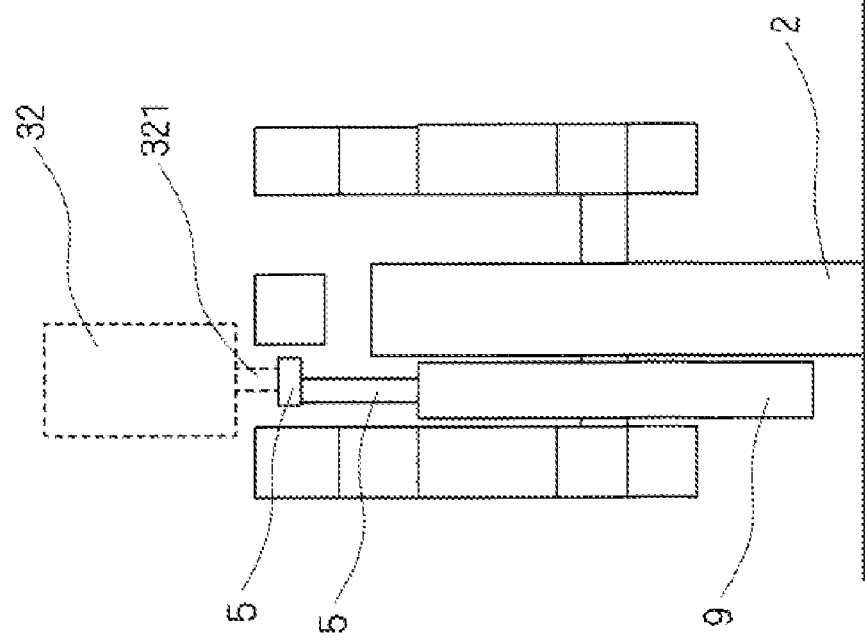

FALLING PREVENTION CONTROLLING DEVICE AND COMPUTER PROGRAM

BACKGROUND OF THE INVENTION

1. Field of the Invention

The present invention relates to a falling prevention controlling device and a computer program to prevent even a monocycle from falling in a pitch direction.

2. Description of the Related Art

Conventionally, when, for example, two-wheeled vehicles and two-legged walking robots move, a main body swings in a roll direction, which has an axis extending in a substantially front-back direction, and therefore, it is necessary to control an operation to move or stop the vehicle or robot without falling by controlling the balance in the roll direction. To prevent falling in the roll direction, it is necessary to accurately detect the inclination in the roll direction. A method of detecting the inclination of the body to control the balance in the roll direction includes, for example, a method of detecting an angular velocity using an angular velocity sensor and estimating the inclination by integrating the detected value, and a method of detecting the inclination using a weight (deadweight).

However, with the method of integrating an angular velocity using an angular velocity sensor, when an angular velocity output detected by the angular velocity sensor includes a noise and an offset, the noise and the offset are amplified by integration. The amplified noise and offset accumulate, and therefore, there is a problem in that a shift from a target value increases and the estimation of an inclined angle and control of falling prevention cannot be effectively performed.

In contrast, with the method of detecting the inclination using a weight, the inclination cannot be reflected instantly due to the influence of the gravity, and therefore, the responsiveness of this method is poor and the inclination is detected in the vertical direction. Thus, there is a problem in that the inclination with respect to the balanced state cannot be detected. When, for example, the gravity center position is shifted in the roll direction, if, for example, a side wind is blowing, the balanced state is not necessarily maintained in the vertical direction. In order to prevent falling, it is necessary to restore the inclined state to the balanced state and detect the inclination with respect to the balanced state.

For example, WO 2007/063665 proposes a falling prevention controlling device which includes an angular velocity sensor which orients a detection axis toward a substantially front-back direction of the main body, a motor which orients a rotation axis in the substantially front-back direction of the main body, a rotation sensor which detects the rotation position or the rotation velocity of the motor, and an inertia rotor which is connected to the rotation axis of the motor, which estimates the inclined angle of the main body with respect to the balanced state, from the angular velocity output of the angular velocity sensor and the torque command provided to the motor, and which corrects the inclination of the main body using the estimated inclined angle.

According to WO 2007/063665, the angular velocity output does not need to integrated and, therefore, a noise and an offset are not accumulated. Moreover, the inclined angle with respect to the balanced state can be estimated, so that the inclined state can be corrected to the balanced state in the left-right direction using the estimated inclined angle. However, although, for example, two-wheeled vehicles can be prevented from falling as long as the balance in the left-right direction can be controlled, monocycles, for example, fall in the front-back direction if the balance in the front-back direction is not controlled even though the balance in the left-right direction is controlled.

According to "Monocycle Attitude Control", Takashi KASAI, master thesis of Doctoral Course in Graduate School of System Information Technology, University of Tsukuba, January 2005, pages 1 to 37 (hereinafter "Kasai"), a gyro sensor and two acceleration sensors are used to estimate the inclination of a monocycle in the front-back direction. When acceleration sensors are spaced apart from the rotation axis, vibration is applied to the acceleration sensors, and therefore, a correct value is estimated by canceling the acceleration due to the vibration using the two acceleration sensors. The angle $\theta a$ calculated from the two acceleration sensors and the angle $\theta z$ of an integral value of the angular velocity obtained from the gyro sensor are output, $\theta a$ and $\theta z$ are filtered to cancel high frequency noise included therein, and the deviation e of the filtered values is input to provide as $d\theta z$ the output multiplied by an observer gain, and use an estimated value $\theta z$ hat obtained by correcting the angle $\theta z$ by $d\theta z$ for controlling.

According to Kasai, although the angle $\theta z$ obtained by simply integrating the angular velocity acquired in the gyro sensor is shifted over time, the estimated value $\theta z$ obtained by correcting the angle $\theta z$ can maintain a constant value, so that it is possible to correct a shift of an offset of the angle calculated from the angular velocity acquired in the gyro sensor, by using the corrected estimated value $\theta z$ hat.

However, with the monocycle of Kasai, although the inclination with respect to the gravity direction (vertical direction) is measured by acceleration sensors, the balanced state in the vertical direction is not necessarily maintained in the front-back direction similar to the above left-right direction. Therefore, there is a problem in that, when the balanced state is not maintained in the vertical direction, the inclined state cannot be corrected to the balanced state. Further, two acceleration sensors are required in addition to a gyro sensor to estimate the inclination, and therefore, there is a problem in that it is difficult to simplify and miniaturize a configuration of a falling prevention controlling device.

SUMMARY OF THE INVENTION

To overcome the problems described above, preferred embodiments of the present invention provide a falling prevention controlling device and a computer program that, with a simple configuration, can precisely correct the inclination in a pitch direction with respect to the balanced state while securing movement in the front-back direction, without accumulating a noise and an offset, and prevent falling in the pitch direction. A falling prevention controlling device according to a preferred embodiment of the present invention preferably includes a wheel which rotates and moves in a front-back direction, and a main body which is connected to a rotation axis of the wheel and which swings in a pitch direction and a roll direction above the wheel. The main body preferably includes a pitch angular velocity sensor arranged to detect a pitch angular velocity which is an angular velocity of an inclined angle in the pitch direction, a pitch motor arranged to rotate the wheel in conjunction with a rotation of the wheel, and a pitch rotation sensor arranged to detect a rotation position or a rotation velocity of the pitch motor. Preferably, the falling prevention controlling device corrects an inclination of the main body in the pitch direction by utilizing a reaction torque resulting from the rotation of the wheel and includes an advance/retreat command receiving unit arranged to receive an advance or a retreat command of the wheel, a target pitch angle calculating unit arranged to calculate a target pitch angle which is a target inclined angle in the pitch direction, based on a rotation velocity deviation in the pick direction calculated from the received advance or retreat command and the rotation angle detected in the pitch rotation sensor, a pitch inclined angle estimating unit arranged to estimate a pitch inclined angle which is an angle at which the main body is inclined in the pitch direction with respect to a balanced state, from the pitch angular velocity detected in the pitch angular velocity sensor and a pitch torque command generated based on the target pitch angle and given to the pitch motor, and a pitch torque command generating unit arranged to generate the pitch torque command based on the target pitch angle and the pitch inclined angle.

Preferably, the advance/retreat command receiving unit receives the advance or the retreat command of the wheel as a rotation velocity or a rotation angle.

Preferably, the falling prevention controlling device further includes a target pitch angular velocity calculating unit arranged to calculate a target pitch angular velocity which is an angular velocity of a target inclined angle in the pitch direction, from a pitch angular deviation obtained by subtracting the pitch inclined angle from the target pitch angle, wherein the pitch torque command generating unit preferably generates the pitch torque command based on a deviation between the target pitch angular velocity and the detected pitch angular velocity.

Preferably, the falling prevention controlling device further includes a pitch direction external torque estimating unit arranged to estimate a pitch direction external torque to incline the main body in the pitch direction, based on the pitch inclined angle, and a torque correcting unit which corrects the pitch torque command in a direction in which the estimated pitch direction external torque is canceled.

Preferably, the main body includes a roll angular velocity sensor arranged to detect a roll angular velocity which is an angular velocity of an inclined angle in the roll direction, an inertia rotor arranged to rotate in the roll direction, a roll motor arranged to rotate the inertia rotor in conjunction with a rotation of the inertia rotor, and a roll rotation sensor arranged to detect a rotation position or a rotation velocity of the roll motor. The falling prevention controlling device preferably includes a target roll angle calculating unit arranged to calculate a target roll angle which is a target inclined angle in the roll direction, based on the rotation velocity in the roll direction detected in the roll rotation sensor, a roll inclined angle estimating unit arranged to estimate a roll inclined angle which is an angle at which the main body is inclined in the roll direction with respect to the balanced state, from the roll angular velocity detected in the roll angular velocity sensor and a roll torque command generated based on the target roll angle and given to the roll motor, a target roll angular velocity calculating unit arranged to calculate a target roll angular velocity which is an angular velocity of a target inclined angle in the roll direction, from a roll angular deviation obtained by subtracting the roll inclined angle from the target roll angle, and a roll torque command generating unit arranged to generate the roll torque command based on a deviation between the target roll angular velocity and the detected roll angular velocity.

A detection axis of the roll angular velocity sensor is preferably oriented toward a front-back direction and a horizontal or substantially horizontal direction in a state in which a gravity center of the main body is on a vertical line crossing the rotation axis of the wheel.

The rotation ratio of the rotation of the wheel is preferably lower than a rotation of the pitch motor.

According to another preferred embodiment of the present invention, a non-transitory computer readable medium includes a program which can be executed by a computer mounted in a falling prevention controlling device that includes a wheel which rotates and moves in a front-back direction, and a main body which is connected to a rotation axis of the wheel and which swings in a pitch direction and a roll direction above the wheel, the main body including a pitch angular velocity sensor arranged to detect a pitch angular velocity which is an angular velocity of an inclined angle in the pitch direction, a pitch motor arranged to rotate the wheel in conjunction with a rotation of the wheel, and a pitch rotation sensor arranged to detect a rotation position or a rotation velocity of the pitch motor, the computer program correcting an inclination of the main body in the pitch direction utilizing a reaction torque resulting from the rotation of the wheel, the computer program causing the computer to function as an advance/retreat command receiver to receive an advance or a retreat command of the wheel, a target pitch angle calculator to calculate a target pitch angle which is a target inclined angle in the pitch direction, based on a rotation velocity deviation in the pick direction calculated from the received advance or retreat command and the rotation angle detected in the pitch rotation sensor, a pitch inclined angle estimator to estimate a pitch inclined angle which is an angle at which the main body is inclined in the pitch direction with respect to a balanced state, from the pitch angular velocity detected in the pitch angular velocity sensor and a pitch torque command generated based on the target pitch angle and given to the pitch motor, and a pitch torque command generator to generate the pitch torque command based on the target pitch angle and the pitch inclined angle.

The advance/retreat command receiver preferably functions as a receiver to receive the advance or the retreat command of the wheel as a rotation velocity or a rotation angle.

The computer program preferably causes the computer to function as a target pitch angular velocity calculator to calculate a target pitch angular velocity which is an angular velocity of a target inclined angle in the pitch direction, from a pitch angular deviation obtained by subtracting the pitch inclined angle from the target pitch angle, wherein the pitch torque command generator is preferably arranged to generate the pitch torque command based on a deviation between the target pitch angular velocity and the detected pitch angular velocity.

Preferably, the computer program preferably causes the computer to function as a pitch direction external torque estimator to estimate a pitch direction external torque to incline the main body in the pitch direction, based on the pitch inclined angle, and a torque corrector to correct the pitch torque command in a direction in which the estimated pitch direction external torque is canceled.

The main body preferably includes a roll angular velocity sensor arranged to detect a roll angular velocity which is an angular velocity of an inclined angle in the roll direction, an inertia rotor arranged to rotate in the roll direction, a roll motor arranged to rotate the inertia rotor in conjunction with a rotation of the inertia rotor, and a roll rotation sensor arranged to detect a rotation position or a rotation velocity of the roll motor, the computer program causing the computer to function as a target roll angle calculator to calculate a target roll angle which is a target inclined angle in the roll direction based on the rotation velocity in the roll direction detected in the roll rotation sensor, a roll inclined angle estimator to estimate a roll inclined angle which is an angle at which the main body is inclined in the roll direction with respect to the balanced state, from the roll angular velocity detected in the roll angular velocity sensor and a roll torque command generated based on the target roll angle and given to the roll motor, a target roll angular velocity calculator to calculate a target roll angular velocity which is an angular velocity of a target inclined angle in the roll direction, from a roll angular deviation obtained by subtracting the roll inclined angle from the target roll angle, and a roll torque command generator to generate the roll torque command based on a deviation between the target roll angular velocity and the detected roll angular velocity.

A falling prevention controlling device according to a preferred embodiment of the present invention preferably receives an advance or a retreat command of a wheel, and calculates a target pitch angle which is a target inclined angle in the pitch direction, based on a rotation velocity deviation in the pick direction calculated from the received advance or retreat command and the rotation angle detected in the pitch rotation sensor. From the pitch angular velocity detected in the pitch angular velocity sensor and the pitch torque command generated based on the target pitch angle and provided to the pitch motor, the pitch inclined angle, which is an angle at which the main body is inclined in the pitch direction with respect to the balanced state, is estimated. The pitch torque command is generated based on the target pitch angle and the pitch inclined angle. Consequently, it is possible to precisely estimate the pitch inclined angle at which the main body is inclined in the pitch direction with respect to the balanced state, and the pitch angular velocity of the pitch angular velocity sensor is not integrated. Therefore, a calculation error of the target pitch angle due to the accumulation of a noise and an offset is not produced, so that it is possible to precisely correct the inclination in the pitch direction with respect to the balanced state by utilizing a reaction torque resulting from a rotation of a wheel, and prevent falling in the pitch direction.

Here, the "pitch inclined angle" refers to a deviation angle between the main body in a basic position and the main body inclined in the pitch direction when the balanced state in the pitch direction is the basic position. The "balanced state" refers to a state in which the sum of external torques, such as torques produced by the gravity applied to, for example, the main body in the pitch direction and torques produced by, for example, a headwind and tailwind becomes 0 (zero).

A falling prevention controlling device according to another preferred embodiment of the present invention preferably receives an advance or a retreat command of a wheel as a rotation velocity or a rotation angle, and calculates a target pitch angle based on a rotation velocity deviation in the pick direction calculated from the received advance or retreat command of the wheel and the rotation angle detected in the pitch rotation sensor, and, consequently, can correct the inclination in the pitch direction while securing the rotation velocity for the commanded movement. Further, it is possible to simplify and miniaturize a falling prevention controlling device with a simple configuration which does not require, for example, an acceleration sensor, and in which only an angular velocity sensor is included, in addition to, for example, a motor required to drive a wheel.

By calculating a target pitch angular velocity which is an angular velocity of a target inclined angle in the pitch direction, from a pitch angular deviation obtained by subtracting a pitch inclined angle from a target pitch angle, and generating a pitch torque command based on the deviation between the target pitch angular velocity and the detected pitch angular velocity, a preferred embodiment of the present invention can generate a pitch torque command to adequately correct the inclination of the main body in the pitch direction while suppressing accumulation of errors.

By estimating a pitch direction external torque for inclining the main body in the pitch direction based on the pitch inclined angle and correcting a pitch torque command in a direction in which the pitch direction external torque estimated in a torque correcting unit is canceled, a preferred embodiment of the present invention can more adequately control rotation of a pitch motor taking into account the influence of the pitch direction external torque, so that it is possible to more precisely correct the inclination in the pitch direction with respect to the balanced state and prevent falling in the pitch direction.

Here, the "pitch direction external torque" refers to a torque combining a torque produced by the gravity applied to, for example, the main body when the main body is inclined in the pitch direction with respect to the balanced state, and torques in the direction (pitch direction) in which the main body is inclined by, for example, a headwind and tailwind. Further, the "torque correcting unit" has a function of correcting a pitch torque command in the direction in which the pitch direction external torque is canceled, and a pitch motor torque command voltage calculating unit described below is included as a component of the torque correcting unit.

A falling prevention controlling device according to another preferred embodiment of the present invention preferably calculates a target roll angle which is the target inclined angle in the roll direction, based on the rotation velocity in the roll direction detected in the roll rotation sensor and estimates a roll inclined angle which is the angle at which the main body is inclined in the roll direction with respect to the balanced state, from the roll angular velocity detected in a roll angular velocity sensor and a roll torque command generated based on the target roll angle and given to a roll motor.

A falling prevention controlling device according to another preferred embodiment of the present invention preferably calculates the target roll angular velocity which is an angular velocity of the target inclined angle in the roll direction, from the roll angular deviation obtained by subtracting the roll inclined angle from the target roll angle, and generates a roll torque command based on a deviation between the target roll angular velocity and the detected roll angular velocity. Consequently, it is possible to precisely estimate the roll inclined angle at which the main body is inclined in the roll direction with respect to the balanced state, and the roll angular velocity of the roll angular velocity sensor is not integrated. Therefore, a calculation error of the target roll angle due to the accumulation of a noise and an offset is not produced, so that it is possible to precisely correct the inclination in the roll direction with respect to the balanced state by utilizing a reaction torque resulting from rotation of the inertia rotor, and prevent falling in the roll direction.

By orienting the detection axis of the roll angular velocity sensor in the front-back direction and the horizontal or substantially horizontal direction in a state in which the gravity center of the main body is on the vertical line crossing the rotation axis of the wheel, the roll angular velocity sensor can detect an accurate angular velocity in the roll direction, so as to precisely correct the inclination in the roll direction. The roll angular velocity sensor using a vibrator obtains the angular velocity by detecting a signal corresponding to the force in a direction perpendicular or substantially perpendicular to the vibrating direction of the vibrator. The detection axis of the roll angular velocity sensor is attached to the main body and is oriented toward the substantially front-back direction. Therefore, the direction of the force to be detected by the roll angular velocity sensor is a substantially vertical direction perpendicular or substantially perpendicular to the detection axis of the substantially front-back direction. When the angular velocity is detected in a state in which the detection axis of the roll angular velocity sensor is oriented toward the front-back direction and the horizontal or substantially horizontal direction, the force in the vertical direction can be detected, so that it is possible to accurately obtain the angular velocity which is actually produced in the roll direction. However, when the angular velocity is detected in a state in which the center of gravity of the main body is deviated and, for example, the front side of the detection axis of the roll angular velocity sensor rather than the horizontal direction is inclined forward, the angular velocity is obtained by detecting the force in the direction which is shifted by a predetermined angle from the vertical direction, and the angular velocity less than the actual angular velocity is detected.

By, for example, driving the wheel with a pitch motor through bevel gears, pulleys and a belt such that the rotation ratio of the rotation of the wheel becomes less than the rotation of the pitch motor, and increasing a reduction ratio of the pulley on the pitch motor side three times as much as the pulley on the wheel side, a preferred embodiment of the present invention can control the wheel with a torque which is one third of the torque of the pitch motor. Further, such a preferred embodiment of the present invention can control the wheel at a torque ratio lower than the torque of the pitch motor and the substantial critical torque of the motor increases, so that it is possible to increase an allowable angle of the inclined angle at which falling can be prevented.

Consequently, according to the configuration described above, it is possible to precisely estimate the pitch inclined angle at which the main body is inclined in the pitch direction with respect to the balanced state, and the pitch angular velocity of the pitch angular velocity sensor is not integrated and therefore a calculation error of the target pitch angle due to the accumulation of a noise and an offset is not produced, so that it is possible to precisely correct the inclination in the pitch direction with respect to the balanced state by utilizing a reaction torque resulting from a rotation of a wheel, and prevent falling in the pitch direction. Further, by receiving an advance or a retreat command of a wheel, and calculating a target pitch angle based on a rotation velocity deviation in the pick direction calculated from the received advance or retreat command and the rotation angle detected in the pitch rotation sensor, it is possible to correct the inclination in the pitch direction while securing the rotation velocity for the commanded movement. Furthermore, it is possible to simplify and miniaturize a falling prevention controlling device with a simple configuration which does not additionally require, for example, an acceleration sensor, and in which an angular velocity sensor is only added in addition to, for example, a motor required to drive a wheel.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 5A and 5B are schematic views illustrating a configuration to drive a wheel through bevel gears, pulleys and a belt by a pitch motor.

FIGS. 8A and 8B are schematic views illustrating a configuration to drive a wheel by a pitch motor through bevel gears and a gear.

DETAILED DESCRIPTION OF THE PREFERRED EMBODIMENTS

Hereinafter, examples will be described with reference to the drawings in which a falling prevention controlling device according to preferred embodiments of the present invention is preferably applied to a monocycle robot which moves back and forth without falling due to a rotation of a monocycle while the main body mounted on the monocycle swings.

Figure 1:
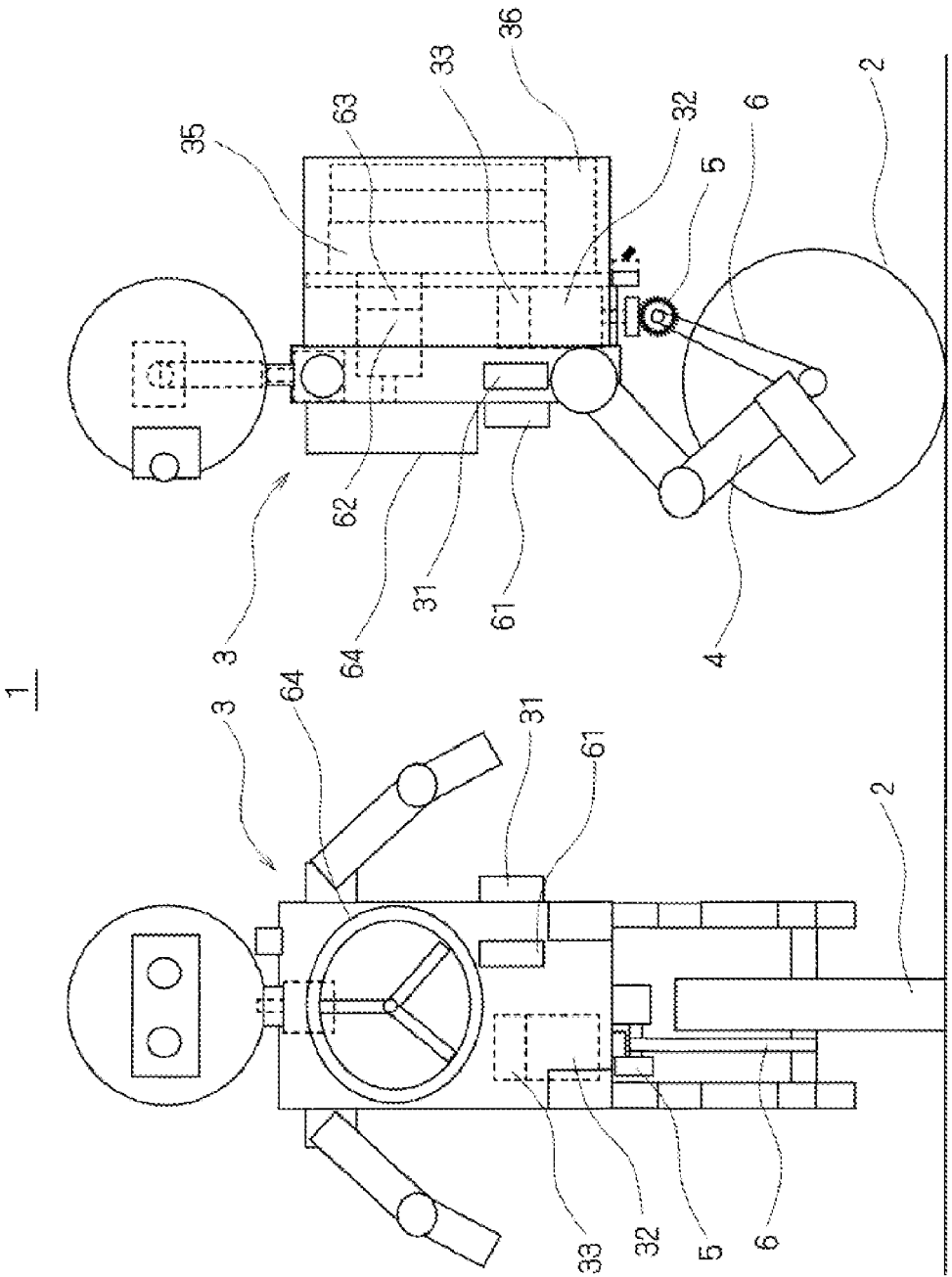
FIGS. 1A and 1B are a front view and a lateral side view schematically illustrating a configuration of a monocycle robot to which a falling prevention controlling device according to a preferred embodiment of the present invention is applied.

FIGS. 1A and 1B are a front view and a lateral side view schematically illustrating a configuration of a monocycle robot to which a falling prevention controlling device according to a preferred embodiment of the present invention is applied.

FIG. 1A is a front view and FIG. 1B is a right side view. The falling prevention controlling device according to the present preferred embodiment functions to prevent the monocycle robot from falling in the pitch direction and in the roll direction.

As illustrated in FIGS. 1A and 1B, a monocycle robot 1 preferably includes a wheel 2 which rotates and moves in the front-back direction, and a main body 3 which is connected to the rotation axis of the wheel 2 and which swings in the pitch direction and in the roll direction above the wheel 2. With the examples of FIGS. 1A and 1B, although the main body 3 is preferably a humanoid robot, the main body 3 is not limited to this.

Figure 2:
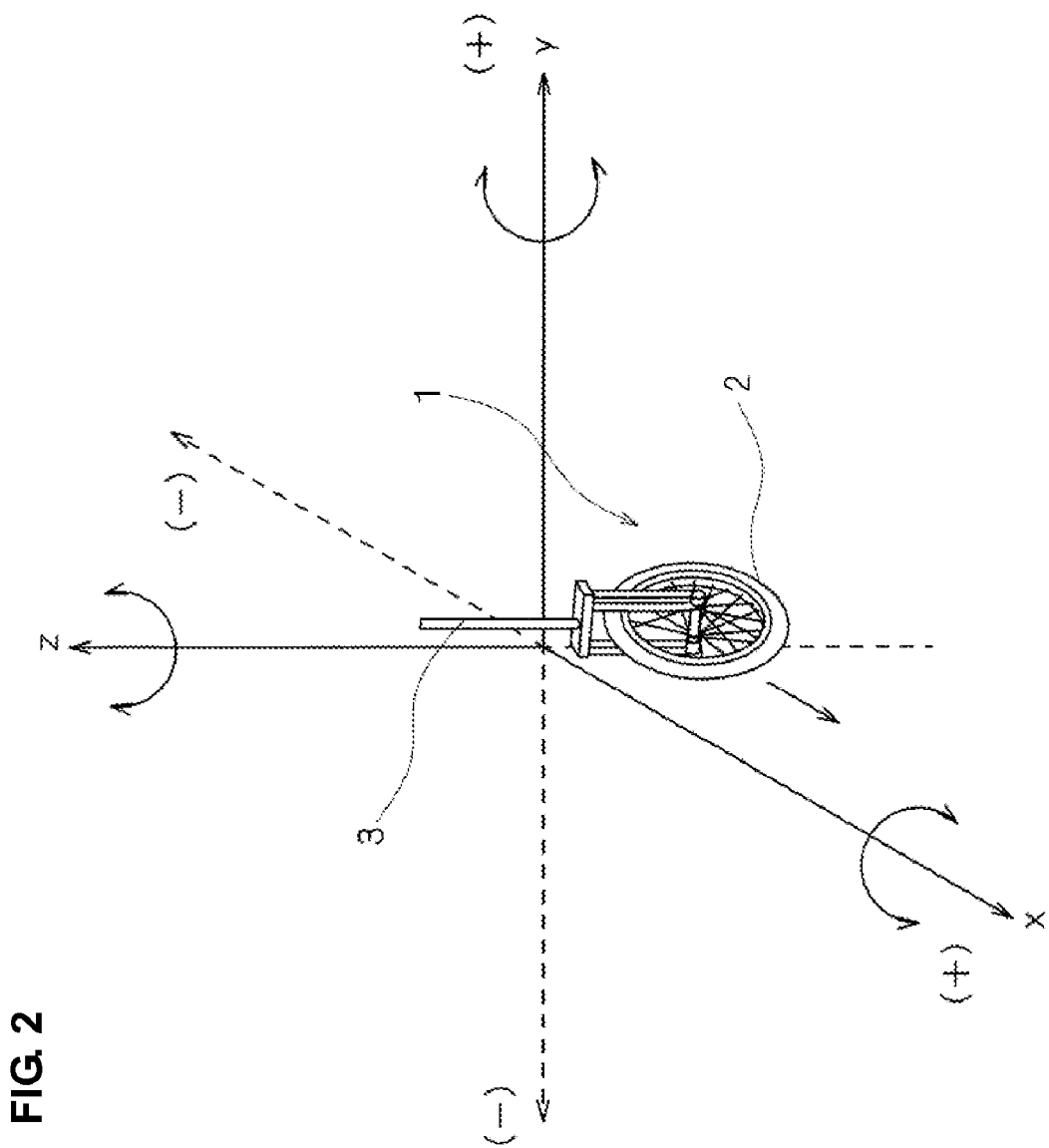
FIG. 2 is a schematic view illustrating a pitch direction, a roll direction and a yaw direction.

Here, the pitch direction and the roll direction will be clarified. FIG. 2 is a schematic view illustrating the pitch direction, roll direction and the yaw direction. As illustrated in FIG. 2, when the monocycle robot 1 advances toward +x axis direction on the xy plane or retreats toward the −x axis direction, the rotation direction about the y axis is the pitch direction. When the monocycle robot 1 rotates counterclockwise facing the +y axis direction, the main body 3 is inclined forward and, when the monocycle robot 1 rotates clockwise facing the +y axis direction, the main body 3 is inclined backward. Further, the rotation axis about the x axis is the roll direction, and the rotation direction when the main body 3 swings in the left-right direction. Furthermore, the rotation direction about the z axis is the yaw direction, and the rotation direction when the orientation of the wheel 2 is inclined with respect to the x axis direction.

As illustrated in FIGS. 1A and 1B, the main body 3 preferably includes a pitch gyro sensor (pitch angular velocity sensor) 31 arranged to detect the pitch angular velocity which is an angular velocity of the inclined angle in the pitch direction, a pitch motor 32 arranged to rotate the wheel 2 in conjunction with rotation of the wheel 2, and a pitch encoder (pitch rotation sensor) 33 arranged to detect the rotation position or the rotation velocity of the pitch motor 32. The pitch gyro sensor 31 is attached to the main body 3 and oriented along a detection axis (not illustrated) which detects the pitch angular velocity in a substantially left-right direction. Here, the "substantially left-right direction" means that the direction may include a slightly greater or slightly less angular shift with respect to the strict left-right direction. The main body 3 and wheel 2 are connected through frame 4 which rotatably supports the wheel 2, and a rotation of the pitch motor 32 is preferably transmitted to the wheel 2 through the bevel gears 5 and belt 6 included in the main body 3, for example. The frame 4 is a portion of the main body 3, and, with the examples of FIGS. 1A and 1B, preferably defines the legs of a humanoid robot which is the main body 3. In addition, the pitch angular velocity sensor only needs to detect the pitch angular velocity and is not limited to a gyro sensor.

Figure 3:
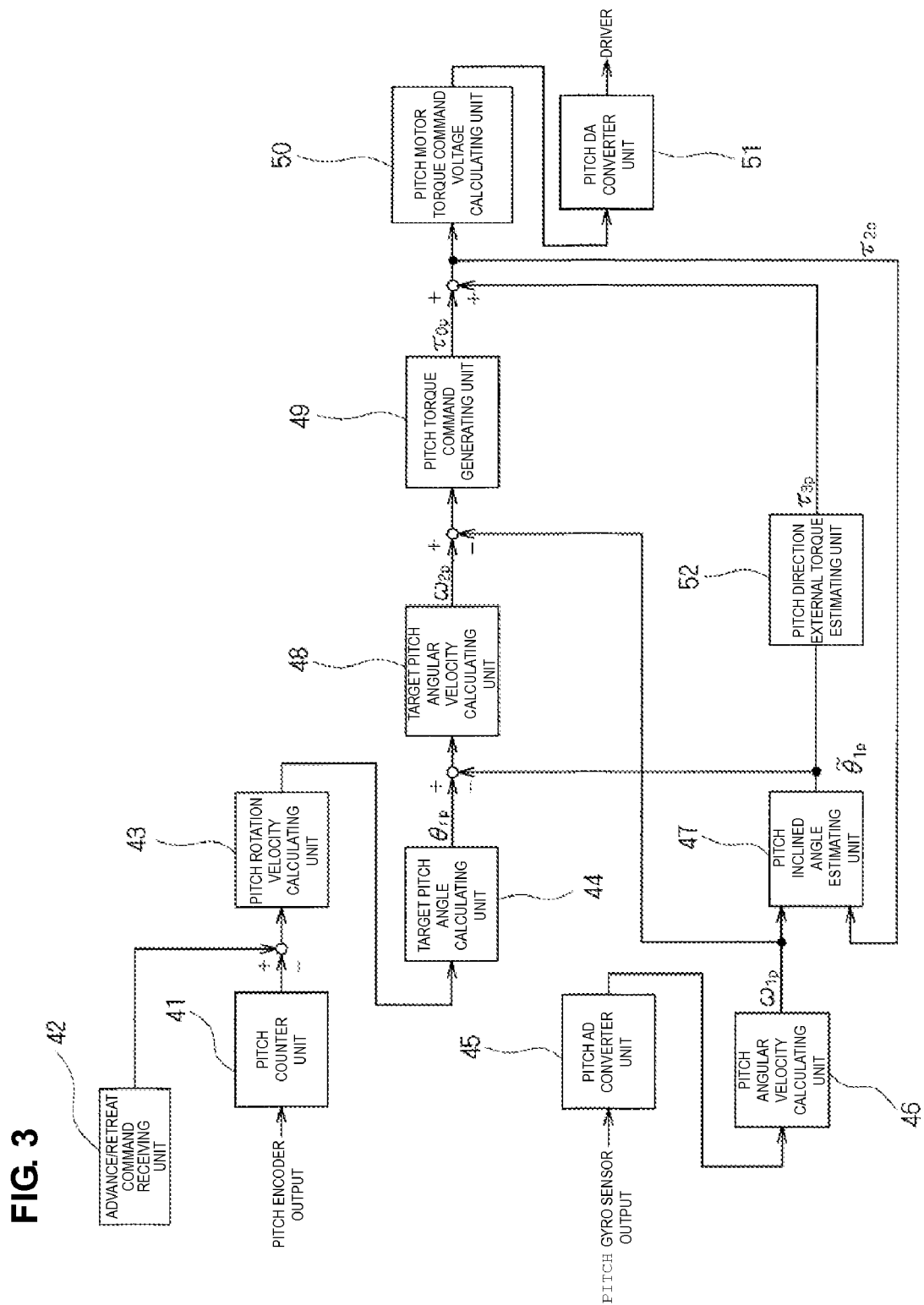
FIG. 3 is a control block diagram illustrating an example of control to prevent a monocycle robot from falling in a pitch direction.

Further, a control board 35 which controls the pitch motor 32 and a battery 36 are preferably mounted in the back of the humanoid robot which is the main body 3. On the control board 35, for example, a driver which drives and rotates the pitch motor 32, an A/D converter, a D/A converter, a counter and a controller are preferably mounted. To be more specific, the controller is preferably, for example, a microprocessor, CPU, or LSI. In order to maintain the balance in the pitch direction, the monocycle robot 1 preferably performs control of the balance by utilizing a reaction caused when the wheel 2 is driven. FIG. 3 is a control block diagram illustrating an example of control to prevent the monocycle robot 1 from falling in the pitch direction.

As illustrated in FIG. 3, a pitch counter unit 41 counts output pulses of the pitch encoder 33. The advance/retreat command receiving unit 42 receives an advance command or a retreat command of the wheel 2 as the rotation velocity or the rotation angle. When the advance command or the retreat command is output as the rotation velocity, a pitch rotation velocity calculating unit 43 subtracts the number of pulses counted in the pitch counter unit 41, from the number of pulses of a pulse signal of the advance command or the retreat command, converts the number of pulses resulting from the subtraction into the rotation angle, and then differentiates the converted rotation angle to obtain the rotation velocity of the pitch motor 32. A LPF (Low Pass Filter) for noise cancellation may preferably be provided.

Preferably, from the rotation velocity of the pitch motor 32 obtained in the pitch rotation velocity calculating unit 43, a target pitch angle calculating unit 44 multiplies the rotation velocity of the pitch motor 32 by a proportionality coefficient such that, when the pitch motor 32 rotates in a direction in which the wheel 2 advances, the target pitch angle is set in a direction in which the wheel 2 advances and, when the pitch motor 32 rotates in a direction in which the wheel 2 retreats, the target pitch angle is set in a direction in which the wheel 2 retreats. With this configuration, it is possible to correct the inclination in the pitch direction while securing the rotation velocity for the commanded movement.

A pitch AD converter unit 45 measures a pitch angular velocity output of the pitch gyro sensor 31. A pitch angular velocity calculating unit 46 multiplies the pitch angular velocity output by a conversion coefficient to calculate a pitch angular velocity $\omega_{1p}$.

From the pitch angular velocity $\omega_{1p}$ and the pitch torque command $\tau_{2p}$ described below, a pitch inclined angle estimating unit 47 calculates the pitch inclined angle according to equation 18, which will be described below, derived based on a motion equation of the inclined angle direction (pitch direction) in the system including the main body 3 and wheel 2. By adding in series a first-order lag element in order to provide a more adequate estimated velocity and stabilizing a loop, an estimated value of the pitch inclined angle is calculated. More specifically, although, for example, $1/(0.1S+1)$ is preferably added as the first-order lag element in series to the calculated value obtained by equation 18, the lag element is not limited to this value and a random lag element may be added to provide an adequate estimated velocity.

A pitch direction external torque estimating unit 52 multiplies the estimated value of the pitch inclined angle by a conversion coefficient, calculates the estimated value of the pitch direction external torque applied to the main body 3, and generates a pitch correction torque (corresponding to the estimated value of the pitch direction external torque) $\tau_{3p}$.

A target pitch angular velocity calculating unit 48 multiplies by a proportional gain a pitch angular deviation obtained by subtracting the estimated value of the pitch inclined angle from the target pitch angle to calculate a target pitch angle velocity $\omega_{2p}$. A pitch torque command generating unit 49 generates a pitch torque command $\tau_{0P}$ preferably by, for example, performing PI control with respect to the deviation between the target pitch angular velocity $\omega_{2p}$ and the pitch angular velocity $\omega_{1p}$. A pitch motor torque command voltage calculating unit 50 multiplies by a conversion coefficient the pitch torque command $\tau_{2p}$ obtained by adding the pitch torque command $\tau_{0P}$ and the pitch correction torque $\tau_{3P}$ to generate a command voltage. Finally, a pitch DA converter unit 51 outputs the command voltage to the driver to control a rotation of the pitch motor 32.

Figure 4:
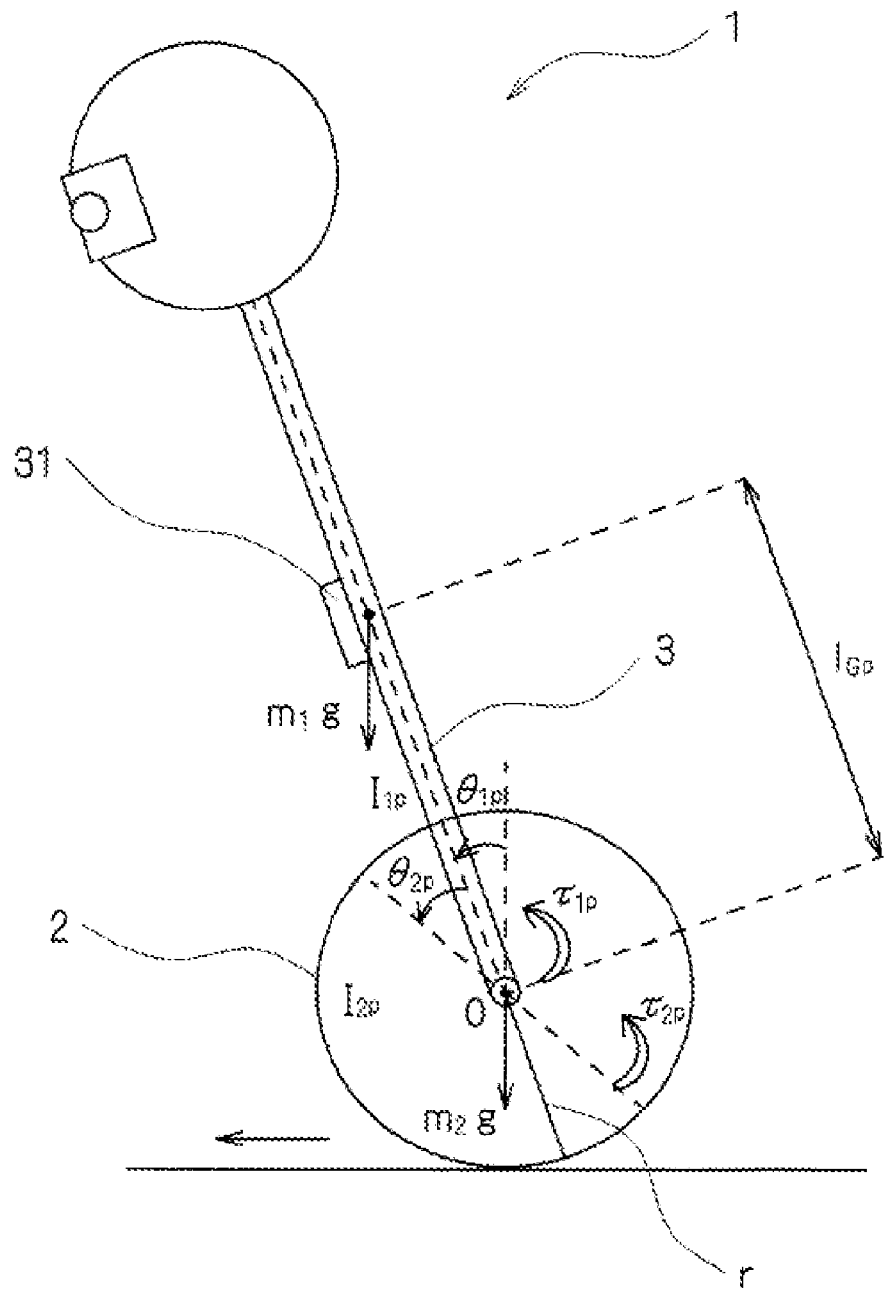
FIG. 4 is a schematic view showing a model of a monocycle robot from a lateral side.

Here, the method of deriving an equation to calculate the pitch inclined angle represented by equation 18 will be described below. FIG. 4 is a schematic view showing a model of the monocycle robot 1 from the lateral side. FIG. 4 schematically illustrates only the wheel 2, main body 3, and the pitch gyro sensor 31 attached to the main body 3, where the direction of the arrow is the advancing direction and the body 3 is inclined forward. First, the motion equation is preferably derived according to a Lagrange equation, for example. An overall kinetic energy T and a potential energy U of the main body 3 and the wheel 2 are as follows.

$$T = \frac{1}{2}I_{1p}\dot{\theta}_{1p}^2 + \frac{1}{2}I_{2p}(\dot{\theta}_{1p} + \dot{\theta}_{2p})^2 \quad \text{(Equation 1)}$$

$$U = m_1 l_{Gp} g \cos\theta_{1p} + m_2 r g \quad \text{(Equation 2)}$$

where:
$I_{1p}$: inertia moment of main body around rotation center O,
$\theta_{1p}$: inclined angle of main body in pitch direction with respect to vertical axis,
$I_{2p}$: inertia moment of wheel around rotation center O,
$\theta_{2p}$: rotation angle of wheel with respect to main body,
$M_1$: mass of main body,
$l_{Gp}$: distance from rotation center O to main body gravity center position,
g: gravity acceleration,
r: radius of wheel, and
$m_2$: mass of inertia rotor.

The differential quantum of the generalized coordinate and generalized velocity is as follows.

$$\frac{\partial T}{\partial \dot{\theta}_{1p}} = I_{1p}\dot{\theta}_{1p} + I_{2p}(\dot{\theta}_{1p} + \dot{\theta}_{2p}) \quad \text{(Equation 3)}$$

$$\frac{\partial T}{\partial \dot{\theta}_{2p}} = I_{2p}(\dot{\theta}_{1p} + \dot{\theta}_{2p}) \quad \text{(Equation 4)}$$

$$\frac{\partial T}{\partial \theta_{1p}} = 0 \quad \text{(Equation 5)}$$

$$\frac{\partial T}{\partial \theta_{2p}} = 0 \quad \text{(Equation 6)}$$

$$\frac{\partial U}{\partial \theta_{1p}} = -m_1 l_{Gp} g \sin\theta_{1p} \quad \text{(Equation 7)}$$

$$\frac{\partial U}{\partial \theta_{2p}} = 0 \quad \text{(Equation 8)}$$

Equation 3 to equation 8 are substituted in Lagrange equations of equation 9 and equation 10.

$$\frac{d}{dt}\left(\frac{\partial T}{\partial \dot{\theta}_{1p}}\right) - \frac{\partial T}{\partial \theta_{1p}} + \frac{\partial U}{\partial \theta_{1p}} = \tau_{1p} \quad \text{(Equation 9)}$$

$$\frac{d}{dt}\left(\frac{\partial T}{\partial \dot{\theta}_{2p}}\right) - \frac{\partial T}{\partial \theta_{2p}} + \frac{\partial U}{\partial \theta_{2p}} = \tau_{2p} \quad \text{(Equation 10)}$$

where:
$\tau_{1p}$: torque around rotation center O which is applied to main body, and
$\tau_{2p}$: torque which is applied to wheel.

As a result, the following equation 11 and equation 12 are acquired as motion equations.

$$I_{1p}\ddot{\theta}_{1p} + I_{2p}(\ddot{\theta}_{1p} + \ddot{\theta}_{2p}) - m_1 l_{Gp} g \sin\theta_{1p} = \tau_{1p} \quad \text{(Equation 11)}$$

$$I_{2p}(\ddot{\theta}_{1p} + \ddot{\theta}_{2p}) = \tau_{2p} \quad \text{(Equation 12)}$$

Equation 13 is provided by modifying equation 12.

$$\ddot{\theta}_{2p} = \frac{\tau_{2p}}{I_{2p}} - \ddot{\theta}_{1p} \quad \text{(Equation 13)}$$

Equation 14 is provided by substituting equation 13 in equation 11 and approximating $\sin\theta_{1p}$ by $\theta_{1p}$. According to equation 14, the motion of the main body 3 is irrelevant to the angle and the angular velocity of the wheel 2.

$$I_{1p}\ddot{\theta}_{1p} - m_1 l_{Gp} g \theta_{1p} = \tau_{1p} - \tau_{2p} \quad \text{(Equation 14)}$$

Although the pitch inclined angle can also be obtained by integrating the output of the pitch gyro sensor 31, the deviation accumulates, thereby making the pitch inclined angle inaccurate. Therefore, the pitch inclined angle needs to be obtained by another method. Thus, using the motion equation of the model illustrated in FIG. 4, the pitch inclined angle is estimated from the pitch angular velocity $\omega_{1p}$ output from the pitch gyro sensor 31 and the pitch torque command $\tau_{2p}$. Equation 15 is provided by modifying the motion equation of equation 14.

$$\theta_{1p} + \frac{\tau_{1p}}{m_1 l_{Gp} g} = \frac{\tau_{2p} + I_{1p}\ddot{\theta}_{1p}}{m_1 l_{Gp} g} \quad \text{(Equation 15)}$$

In contrast, the pitch angular velocity $\omega_{1p}$ output from the pitch gyro sensor 31 is represented by equation 16.

$$\dot{\theta}_{1p} \approx \omega_{1p} \quad \text{(Equation 16)}$$

Further, when a torque $\tau_{1p}$ in the direction (pitch direction) in which the main body 3 is inclined by, for example, a headwind or tailwind is produced, an apparent balanced inclined angle $\theta_{0P}$ is provided by equation 17.

$$\theta_{0p} = -\frac{\tau_{1p}}{m_1 l_{Gp} g} \quad \text{(Equation 17)}$$

Accordingly, the deviation angle (pitch inclined angle) of the current inclined angle $\theta_{1p}$ in the pitch direction with respect to the apparent balanced inclined angle can be estimated by calculating equation 18 derived from above equation 15, equation 16, and equation 17. Meanwhile, the first-order lag element is preferably added to provide an adequate estimated velocity and stabilize the loop. In addition, equation 18 is an example of a calculation equation to estimate the pitch inclined angle, and the calculation equation to estimate the pitch inclined angle changes depending on a target model.

$$\hat{\theta}_{1p} \equiv \theta_{1p} - \left(-\frac{\tau_{1p}}{m_1 l_{Gp} g}\right) \approx \frac{\tau_{2p} + I_{1p}\dot{\omega}_{1p}}{m_1 l_{Gp} g} \quad \text{(Equation 18)}$$

By estimating the pitch inclined angle which is the angle at which the main body 3 is inclined in the pitch direction with respect to the balanced state, from the pitch angular velocity $\omega_{1p}$ output from the pitch gyro sensor 31 and the pitch torque command $\tau_{2p}$ generated based on the target pitch angle and provided to the pitch motor 32, it is possible to precisely estimate the pitch inclined angle. Further, the pitch angular velocity of the pitch gyro sensor 31 is not integrated. Therefore, a calculation error of the target pitch angle due to the accumulation of a noise and an offset is not produced, such that it is possible to precisely correct the inclination in the pitch direction with respect to the balanced state by utilizing a reaction torque resulting from a rotation of the wheel 2, and prevent falling in the pitch direction.

Based on the deviation angle (pitch inclined angle) estimated in equation 18, the pitch direction external torque is compensated for.

$$\tilde{\tau}_{2p} = m_1 l_{Gp} g \hat{\theta}_{1p} \quad \text{(Equation 19)}$$

(Equation 19) is added as a torque.

$$\tau_{2p} = \hat{\tau}_{2p} + \tilde{\tau}_{2p} \quad \text{(Equation 20)}$$

When equation 20 holds, the motion equation of equation 14 provides equation 21, so that it is possible to compensate for the pitch direction external torque. It is possible to estimate the pitch direction external torque produced by the inclined angle in the pitch direction with respect to the balanced state according to equation 18 to estimate the pitch inclined angle which is an angle at which the main body 3 is inclined in the pitch direction with respect to the balanced state, and, consequently, calculate the correction torque to cancel the estimated pitch direction external torque. Accordingly, it is possible to more adequately control a rotation of the pitch motor taking into account the influence of the pitch direction external torque and, consequently, to more precisely correct the inclination in the pitch direction with respect to the balanced state and prevent falling in the pitch direction. Particularly, even when the response frequency of an inclined angular loop and an inclined angular velocity loop is relatively low, it is possible to continue falling prevention control by compensating for the pitch direction external torque by feed forward control and, consequently, stable control is provided.

$$I_{1p}\ddot{\theta}_{1p} = -\hat{\tau}_{2p}$$ (Equation 21)

The corrected pitch torque command is output to the driver through the pitch DA converter unit 51 to control a rotation of the pitch motor 32. The rotation of the pitch motor 32 is transmitted to the wheel 2. FIGS. 5A and 5B are schematic views illustrating a configuration according to a preferred embodiment of the present invention in which the pitch motor 32 drives the wheel 2 through the bevel gears 5, pulleys and belt 6. FIG. 5A is a front view and FIG. 5B is a right side view. FIGS. 5A and 5B illustrate only the wheel 2 and portions of the main body 3 on the wheel 2 side which are used to drive the wheel 2 in the monocycle robot 1.

As illustrated in FIGS. 5A and 5B, a rotation of the pitch motor 32 is preferably transmitted to the wheel 2 sequentially through the motor shaft 321, bevel gears 5 and 5, the pulley 7 on the main body 3 side, belt 6, and the pulley 8 on the wheel 2 side, for example. The monocycle robot 1 preferably sets the rotation ratio of the rotation of the wheel 2 to be less than the rotation of the pitch motor 32. More specifically, the monocycle robot 1 preferably sets the reduction ratio of the pulley 7 on the pitch motor 32 side, that is, on the main body 3 side, to be greater than the pulley 8 on the wheel 2 side.

By, for example, increasing the reduction ratio of about three times, the wheel 2 can be controlled with the torque which is about one third of the torque produced by the pitch motor 32, that is, the torque produced according to corrected pitch torque command described above. Consequently, it is possible to increase a substantial critical torque of the pitch motor 32 and increase an allowable angle of the inclined angle at which falling can be prevented.

Figure 6A:
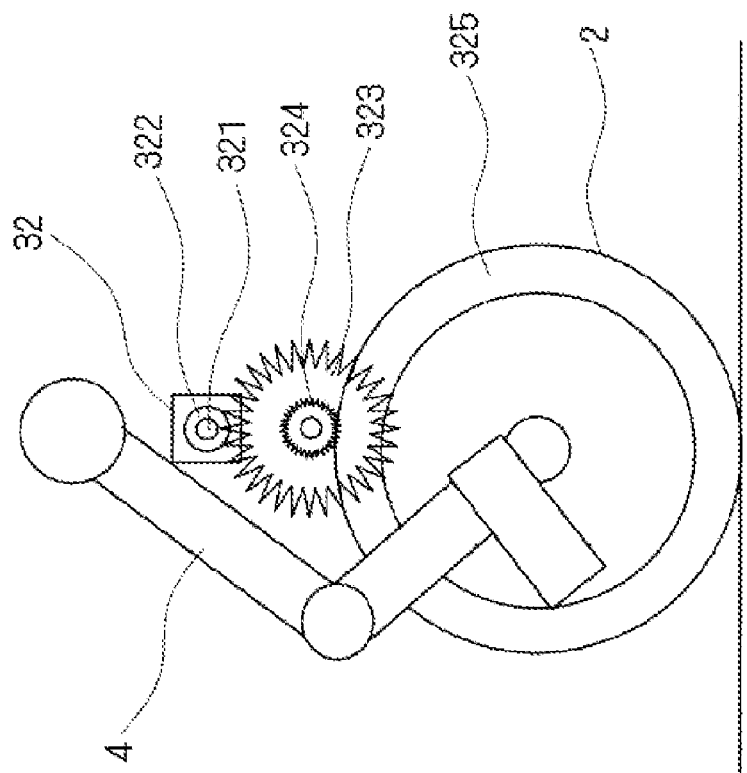
FIGS. 6A and 6B are schematic views illustrating an example of a configuration to directly drive a wheel by a pitch motor through gears.
Figure 6B:
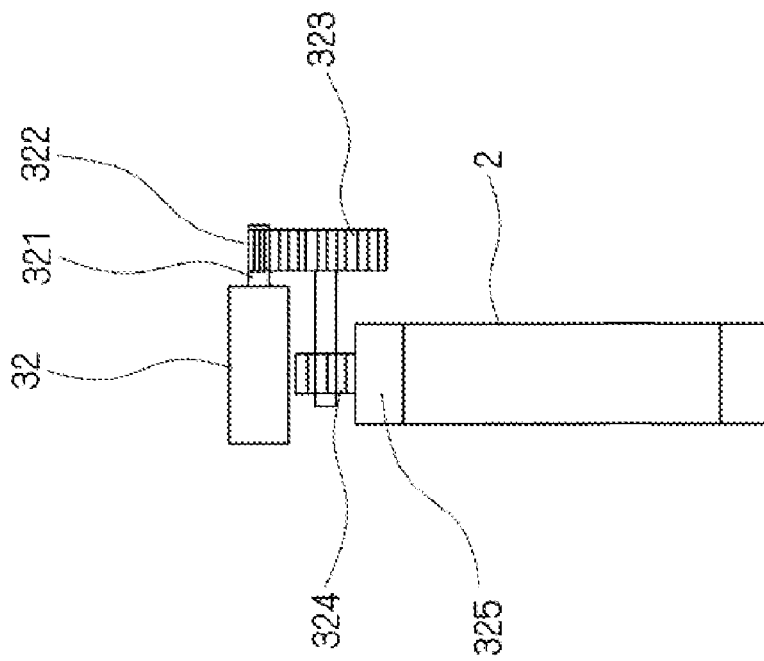

FIGS. 6A and 6B are schematic views illustrating an example of a configuration according to a preferred embodiment of the present invention in which the pitch motor 32 preferably directly drives the wheel 2 through gears. FIG. 6A is a front view and FIG. 6B is a right side view. As illustrated in FIGS. 6A and 6B, a rotation of the pitch motor 32 is directly transmitted to a tire 325 of the wheel 2 by a gear 324 which rotates coaxially with the gear 323 meshing with a gear 322 of the motor shaft 321 of the pitch motor 32.

Figure 7A:
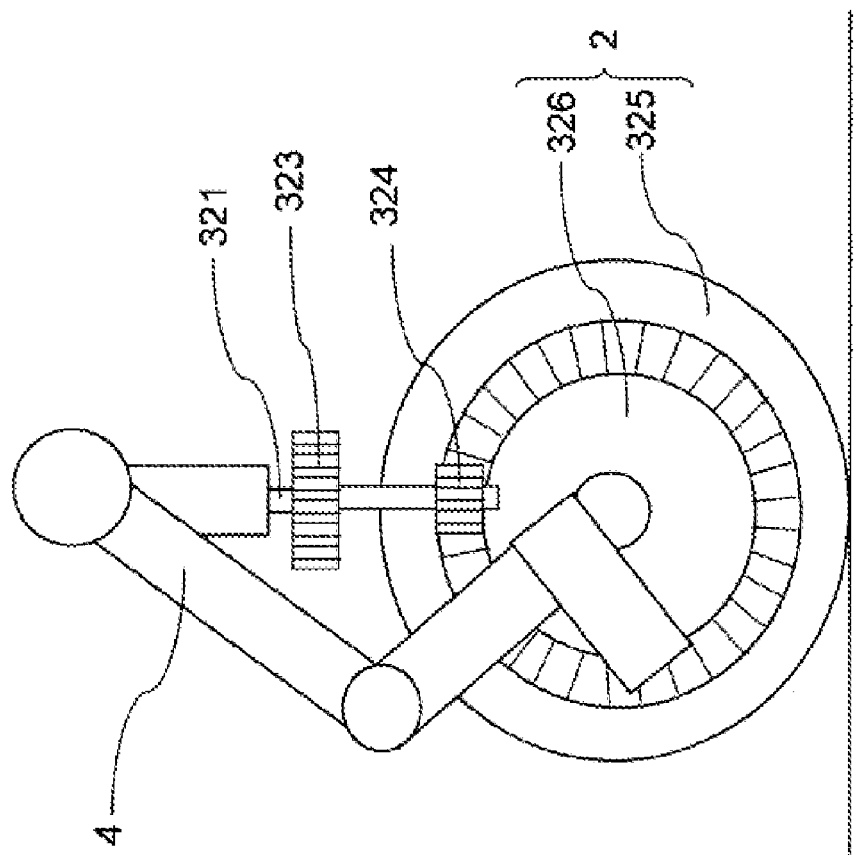
FIGS. 7A and 7B are schematic views illustrating another example of a configuration to directly drive a wheel by a pitch motor through gears.
Figure 7B:
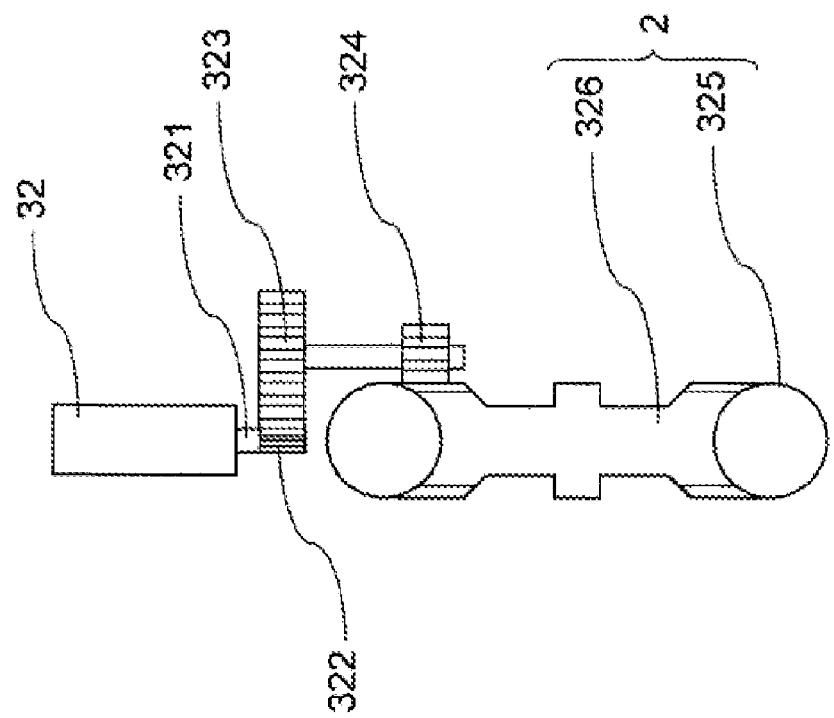

FIGS. 7A and 7B are schematic views illustrating another example of a configuration according to a preferred embodiment of the present invention in which the pitch motor 32 preferably directly drives the wheel 2 through gears. FIG. 7A is a front view and FIG. 7B is a right side view. In addition, the front view of FIG. 7A illustrates the cross section of the wheel 2. As illustrated in FIGS. 7A and 7B, similar to the configuration of FIGS. 6A and 6B, a rotation of the pitch motor 32 is directly transmitted to the wheel 2 by the gear 324 which rotates coaxially with the gear 323 meshing with the gear 322 of the motor shaft 321 of the pitch motor 32. However, the difference from the configuration of FIGS. 6A and 6B is that the rotation is not transmitted to the tire 325 of the wheel 2 as in the configuration of FIGS. 6A and 6B, and instead, is preferably transmitted to the gear provided in the wheel portion 362 of the wheel 2.

The monocycle robot 1 may also include the driving mechanism illustrated in FIGS. 6A and 6B or in FIGS. 7A and 7B. With the driving mechanism illustrated in FIGS. 6A and 6B, the gear 324 is directly pressed against the tire of the wheel 2 to transmit a rotation, and therefore, when, for example, slippage occurs, it is difficult to precisely control the rotation of the wheel 2.

FIGS. 8A and 8B are schematic views illustrating a configuration according to a preferred embodiment of the present invention in which the pitch motor 32 preferably drives the wheel 2 through the bevel gears 5 and 5 and gear 9. FIG. 8A is a front view and FIG. 8B is a right side view. As illustrated in FIGS. 8A and 8B, a rotation of the pitch motor 32 is transmitted to the wheel 2 by the gear 9 which rotates with the rotation axis of the wheel 2, from the bevel gears 5 through the motor shaft 321 of the pitch motor 32. With the driving mechanism illustrated in FIGS. 8A and 8B, similar to the driving mechanism illustrated in FIGS. 5A and 5B, only a backlash of looseness produced by meshing of the gears 5 or gear 9 occurs and, for example, slippage as illustrated in the driving mechanisms illustrated in FIGS. 6A and 6B and FIGS. 7A and 7B does not occur, such that it is possible to precisely control the rotation of the wheel 2. Further, with the driving mechanism illustrated in FIGS. 8A and 8B, by changing the gear ratio (reduction ratio) by interposing an additional gear between the bevel gears 5 and gear 9, it is also possible to increase a substantial critical torque of the pitch motor 32 as in the driving mechanism illustrated in FIGS. 5A and 5B.

Figure 9B:
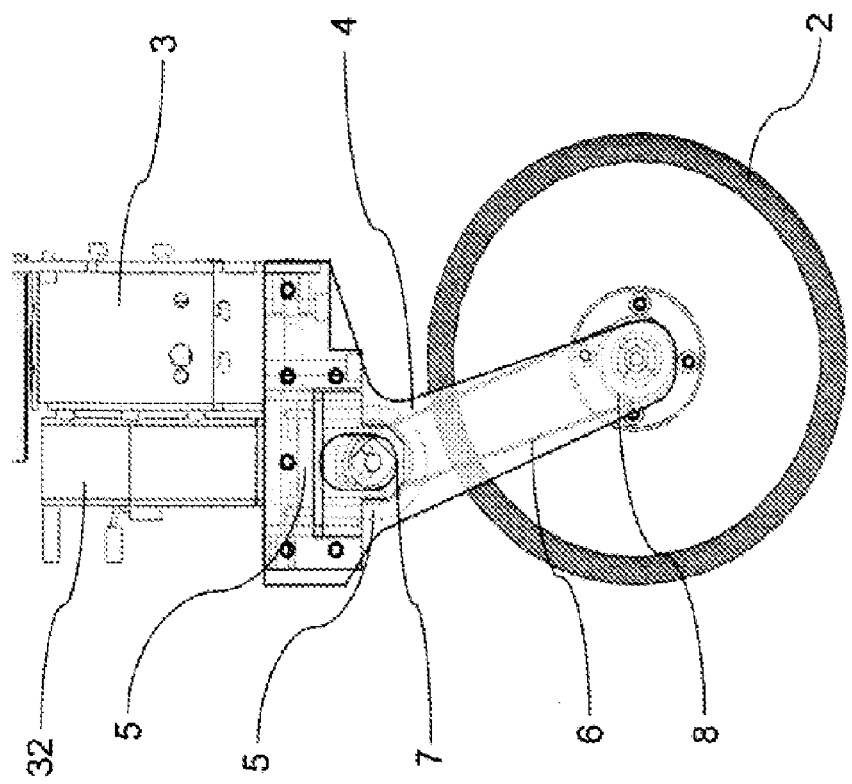
FIGS. 9A and 9B are views illustrating a realistic monocycle robot which includes a driving mechanism illustrated in FIGS. 5A and 5B.
Figure 9A:
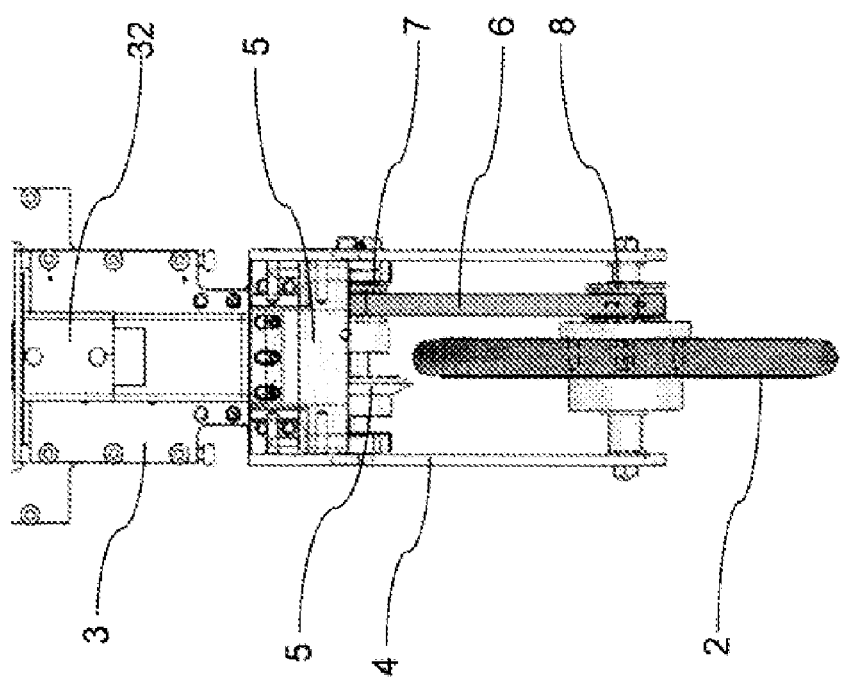

FIGS. 9A and 9B are views illustrating a realistic monocycle robot 1 which includes the driving mechanism illustrated in FIGS. 5A and 5B. FIG. 9A is a front view and FIG. 9B is a right side view. The driving mechanism illustrated in FIGS. 9A and 9B preferably is substantially the same as in FIGS. 5A and 5B, and therefore, a description of the configuration will be omitted. As illustrated in FIGS. 9A and 9B, the bevel gears 5, pulleys 7 and 8 and belt 6 are preferably be accommodated inside the frame 4 so as not to be seen from the lateral side. Thus, it is possible to improve the design as compared to the configuration in which, for example, the gear 9 is seen as in the driving mechanism illustrated in FIGS. 8A and 8B. Accordingly, although the monocycle robot 1 may include any one of the driving mechanisms illustrated in FIG. 5A to FIG. 8B, it is particularly preferable to include the driving mechanism illustrated in FIGS. 5A and 5B which improves the design thereof.

The monocycle robot 1 functions to prevent falling in the pitch direction and the roll direction as described above, and therefore, the configuration to prevent falling in the roll direction will be described below.

As illustrated in FIGS. 1A and 1B, in addition to the configuration described above to prevent falling in the pitch direction, the body 3 preferably includes a roll gyro sensor (roll angular velocity sensor) 61 arranged to detect the roll angular velocity which is the angular velocity of the inclined angle in the roll direction, an inertia rotor 64 arranged to rotate in the roll direction, a roll motor 62 arranged to rotate the inertia rotor 64 in conjunction with a rotation of the inertia rotor 64 and a roll encoder (roll rotation sensor) 63 which detects the rotation position or the rotation velocity of the roll motor 62. The roll gyro sensor 61 is preferably attached to the main body 3 and oriented such that the detection axis (not illustrated), which detects the roll angular velocity, extends substantially in the front-back direction. Here, the "substantially front-back direction" means that the direction may include a slightly greater or less angular shift with respect to the strict front-back direction. In addition, the roll angular velocity sensor 61 is only required to detect the roll angular velocity and is not limited to a gyro sensor.

Figure 10:
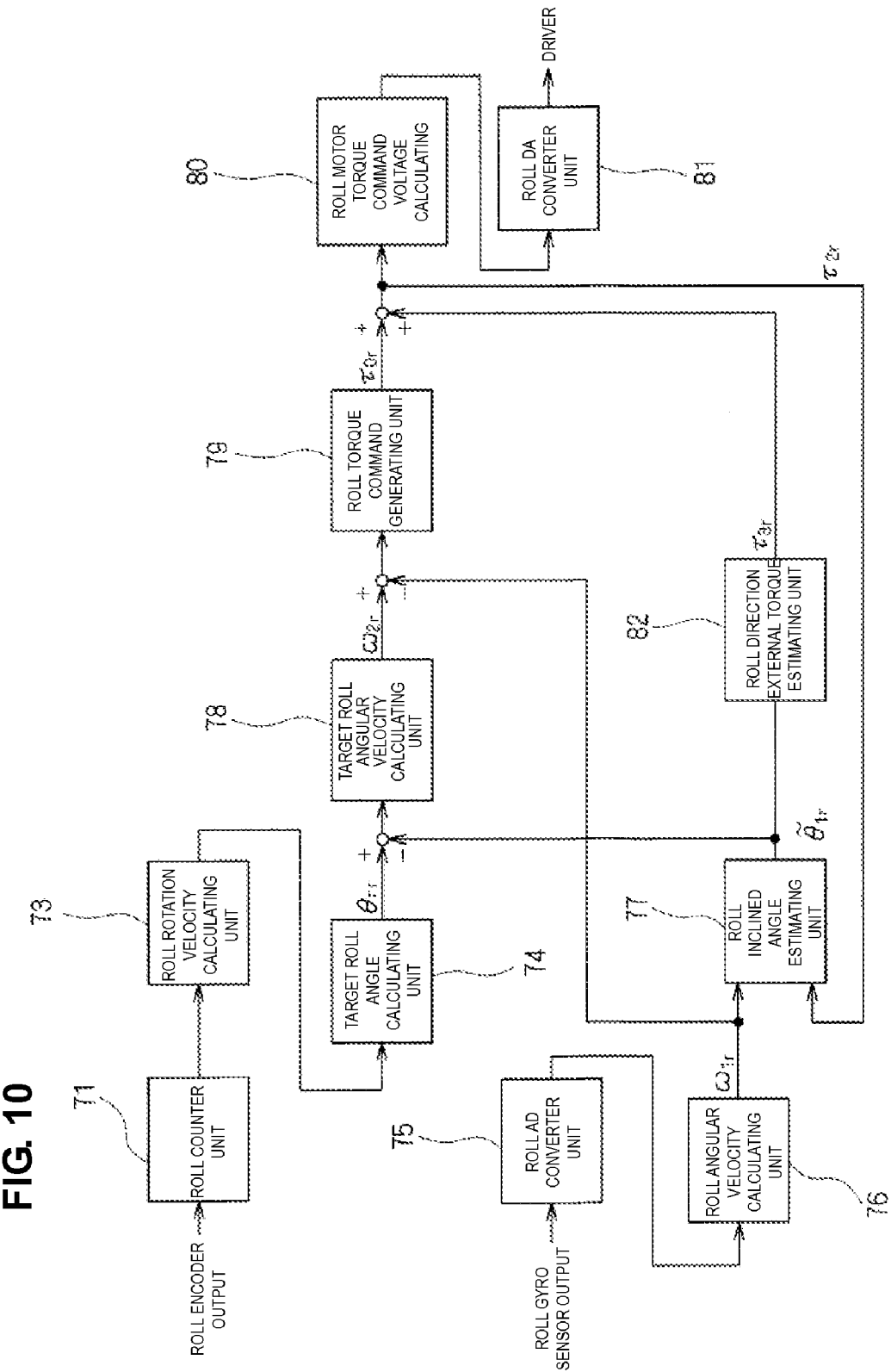
FIG. 10 is a control block diagram illustrating an example of control to prevent a monocycle robot from falling in the roll direction.

Further, the control board 35 mounted on the back of the humanoid robot which is the main body 3 not only controls the pitch motor 32 but also controls the roll motor 62. FIG. 10 is a control block diagram illustrating an example of control to prevent the monocycle robot 1 from falling in the roll direction.

As illustrated in FIG. 10, a roll counter unit 71 counts output pulses of the roll encoder 63. A roll rotation velocity calculating unit 73 converts the output of the roll counter unit 71 into the rotation angle, and then integrates the rotation angle to obtain the rotation velocity of the roll motor 62. A LPF (Low Pass Filter) for noise cancellation may preferably be provided.

A target roll angle calculating unit 74 multiplies the rotation velocity of the roll motor 62 by a proportionality coefficient such that, when the roll motor 62 rotates to the left as seen from the front of the monocycle robot 1, the target roll angle is set in the right direction as seen from the front of the monocycle robot 1 and, when the roll motor 62 rotates to the right as seen from the front of the monocycle robot 1, the target roll angle is set in the left direction as seen from the front of the monocycle robot 1. In addition, an integrator is preferably added to prevent the inertia rotor 64 from continuing steady rotation.

A roll AD converter unit 75 acquires a roll angular velocity output of the roll gyro sensor 61. A roll angular velocity calculating unit 76 multiplies the roll angular velocity output by a conversion coefficient to calculate a roll angular velocity $\omega_{1r}$.

From the roll angular velocity $\omega_{1r}$ and roll torque command $\tau_{2r}$ described below, a roll inclined angle estimating unit 77 calculates the roll inclined angle represented by equation 25, which will be described below, derived based on a motion equation of the inclined angle direction (roll direction) in the system including the main body 3 (the portion other than the inertia rotor 64) and inertia rotor 64. By adding in series a first-order lag element to provide a more adequate estimated velocity and to stabilize a loop, an estimated value of the roll inclined angle is calculated. More specifically, although, for example, 1/(0.1S+1) is preferably added as the first-order lag element in series to the calculated value calculated using equation 25, the lag element is not limited to this and a random lag element may be added to have an adequate estimated velocity.

A roll direction external torque estimating unit 82 multiplies the estimated value of the roll inclined angle by a conversion coefficient, calculates the estimated value of the roll direction external torque applied to the main body 3, and generates a roll correction torque (corresponding to the estimated value of the roll direction external torque) $\tau_{3r}$.

A target roll angular velocity calculating unit 78 multiplies by a proportional gain a roll angular deviation obtained by subtracting the estimated value of the roll inclined angle from the target roll angle to generate a target roll angle velocity $\omega_{2r}$. A roll torque command generating unit 79 generates a roll torque command $\tau_{0r}$ by, for example, performing PI control with respect to the deviation between the target roll angular velocity $\omega_{2r}$ and roll angular velocity $\omega_{1r}$. A roll motor torque command voltage calculating unit 80 multiplies by a conversion coefficient the roll torque command $\tau_{2r}$ obtained by adding the roll torque command $\tau_{0r}$ and roll correction torque $\tau_{3r}$ to generate a command voltage. Finally, a roll DA converter unit 81 outputs the command voltage to the driver to control a rotation of the roll motor 62.

Figure 11:
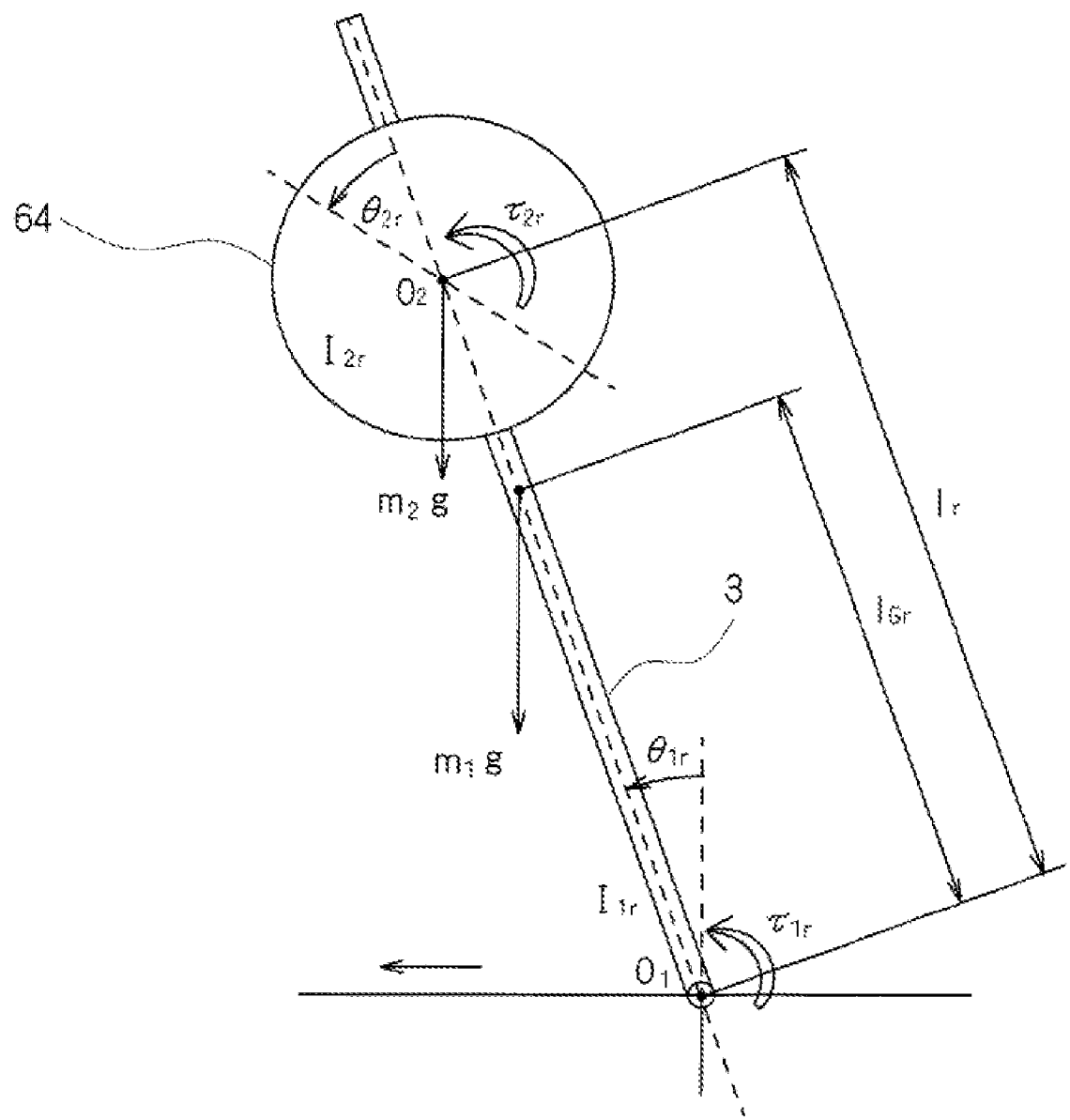
FIG. 11 is a schematic view showing a monocycle robot from the front.

Here, the method of deriving an equation to calculate the roll inclined angle represented by equation 25 will be described below. FIG. 11 is a schematic view showing the monocycle robot 1 from the front. FIG. 11 schematically illustrates only the main body 3 and the inertia rotor 64 attached to the main body 3. First, the motion equation is preferably derived according to a Lagrange equation, for example. The overall kinetic energy T and potential energy U of the main body 3 (the portion other than the inertia rotor 64) and inertia rotor 64 are as follows.

$$T = \frac{1}{2}I_{1r}\dot{\theta}_{1r}^2 + \frac{1}{2}I_{2r}(\dot{\theta}_{1r} + \dot{\theta}_{2r})^2 + \frac{1}{2}m_2l_r^2\dot{\theta}_{1r}^2 \qquad \text{(Equation 22)}$$

$$U = (m_1l_{Gr} + m_2l_r)g\cos\theta_{1r} \qquad \text{(Equation 23)}$$

where:
$I_{1r}$: inertia moment of main body around rotation center $O_1$,
$\theta_{1r}$: inclined angle of main body in roll direction with respect to vertical axis,
$I_{2r}$: inertia moment of inertia rotor around rotation center $O_2$,
$\theta_{2r}$: rotation angle of inertia rotor with respect to main body,
$l_r$: distance from rotation center $O_2$ to $O_2$, and
$l_{Gr}$: distance from rotation center $O_1$ to main body gravity center position.

Equation 24 is derived from equation 22 and equation 23 in substantially the same manner of deriving the above calculation equation of calculating the pitch inclined angle. According to equation 24, the motion of the main body 3 is irrelevant to the angle and the angular velocity of the inertia rotor 64.

$$(I_{1r}+m_2l_r^2)\ddot{\theta}_{1r}-(m_1l_{Gr}+m_2l_r)g\theta_{1r}=\tau_{1r}-\tau_{2r} \qquad \text{(Equation 24)}$$

where:
$\tau_{1r}$: torque around rotation center $O_1$ which is applied to main body, and
$\tau_{2r}$: torque which is applied to inertia rotor Similar to the above pitch inclined angle, although the roll inclined angle can also be obtained by integrating the output of the roll gyro sensor 61, the deviation accumulates, thereby making the roll inclined angle inaccurate. Therefore, the roll inclined angle must to be obtained by another method. In substantially the same manner of estimating the above pitch inclined angle, using the motion equation of the model illustrated in FIG. 11, the roll inclined angle is preferably estimated from the roll angular velocity $\omega_{1r}$ output from the roll gyro sensor 61 and the roll torque command $\tau_{2r}$.

When a torque $\tau_{1r}$ in the direction (roll direction) in which the main body 3 is inclined by, for example, the centrifugal force due to a side wind or curve driving, the deviation (roll inclined angle) of the current inclined angle $\theta_{1r}$ in the roll direction with respect to an apparent balanced inclined angle can preferably be estimated according to equation 25 from the equation obtained by modifying the motion equation of equation 24 and the roll angular velocity $\omega_{1r}$ output from the roll gyro sensor 61. The first-order lag element is preferably added to provide an adequate estimated velocity and stabilize the loop. In addition, equation 25 is an example of a calculation equation to estimate a roll inclined angle, and the calculation equation to estimate a roll inclined angle changes depending on a target model.

$$\hat{\theta}_{1r} \equiv \theta_{1r} - \left(-\frac{\tau_{1r}}{(m_1 l_{Gr} + m_2 l_r)g}\right) \cong \frac{\tau_{2r}(I_{1r} + m_2 l_r^2)\dot{\omega}_{1r}}{(m_1 l_{Gr} + m_2 l_r)g} \quad \text{(Equation 25)}$$

By estimating the roll inclined angle which is the angle at which the main body 3 is inclined in the roll direction with respect to the balanced state, from the roll angular velocity $\omega_{1r}$ output from the roll gyro sensor 61 and the roll torque command $\tau_{2r}$ generated based on the target roll angle and provided to the roll motor 62, it is possible to precisely estimate the roll inclined angle in a similar manner to the pitch angle. Further, the roll angular velocity of the roll angular velocity sensor is not integrated. Therefore, a calculation error of the target roll angle due to the accumulation of a noise and an offset is not produced, such that it is possible to precisely correct the inclination in the roll direction with respect to the balanced state by utilizing a reaction torque resulting from rotation of the wheel 2, and prevent falling in the roll direction.

Based on the deviation angle estimated in equation 25, the roll direction external torque is compensated for.

$$\tilde{\tau}_{2r} = (m_1 l_{Gr} + m_2 l_r)g\hat{\theta}_{1r} \quad \text{(Equation 26)}$$

Equation 26 is added as a torque.

$$\tau_{2r} = \hat{\tau}_{2r} + \tilde{\tau}_{2r} \quad \text{(Equation 27)}$$

When equation 27 holds, the motion equation of equation 24 provides equation 28, so that it is possible to compensate for the roll direction external torque. Accordingly, it is possible to more adequately control a rotation of the roll motor 62 taking into account the influence of the roll direction external torque and, consequently, more precisely correct the inclination in the roll direction with respect to the balanced state and prevent falling in the roll direction.

$$(I_{1r} + m_2 l_r^2)\ddot{\theta}_{1r} = -\hat{\tau}_{2r} \quad \text{(Equation 28)}$$

Figure 12:
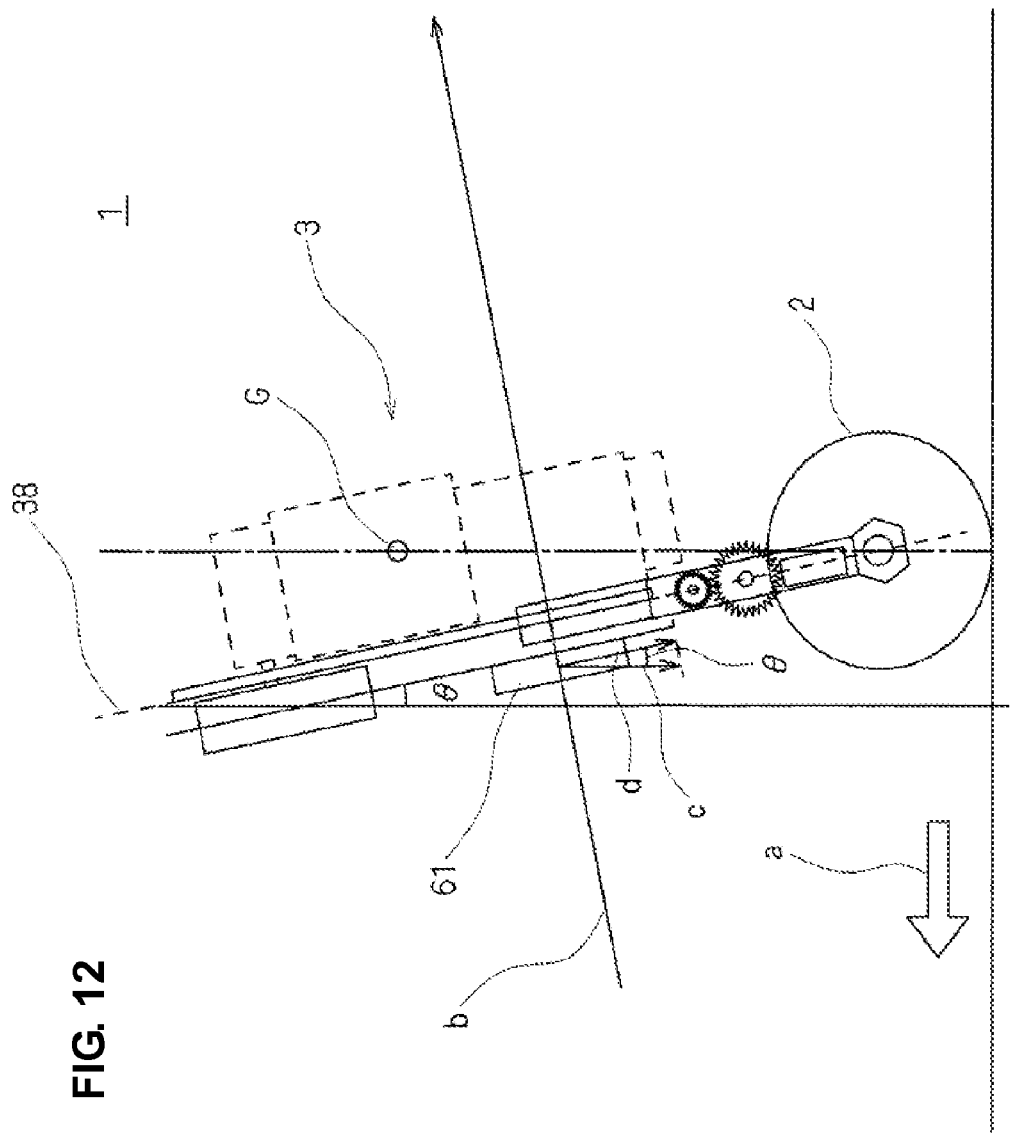
FIG. 12 is a schematic view illustrating the sensitivity of an angular velocity detected in a roll gyro sensor according to the gravity center position of a main body.

FIG. 12 is a schematic view illustrating the sensitivity of the angular velocity detected by the roll gyro sensor 61 according to the gravity center position of the main body 3. FIG. 12 is a view showing the monocycle robot 1 from the right side, in which the bold arrow a indicates the advancing direction and the monocycle robot 1 maintains the balanced state in the pitch direction. The roll gyro sensor 61 is preferably an angular velocity sensor which includes a vibrator, and obtains the angular velocity by detecting a signal corresponding to the force in a direction perpendicular or substantially perpendicular to the vibrating direction of the vibrator. In addition, the direction of the force to be detected is a substantially vertical direction perpendicular or substantially perpendicular to the detection axis of the substantially front-back direction. As illustrated in FIG. 12, the gravity center G of the main body 3 is not on the axis 38 and is towards the rear of the main body 3. Therefore, with the monocycle robot 1, the axis 38 of the main body 3 is not in the vertical direction and is inclined forward in the balanced state in the pitch direction. The roll gyro sensor 61 is preferably attached to the main body 3 so as to orient the detection axis towards the front-back direction and the horizontal or substantially horizontal direction in a state in which the axis 38 of the main body 3 is in the vertical direction and detect the signal corresponding to the force in the vertical direction.

In the balanced state in the pitch direction as illustrated in FIG. 12, the detection axis of the roll gyro sensor 61 is oriented toward the arrow b and its front side beyond the horizontal or substantially horizontal direction is inclined forward. Although the roll gyro sensor 61 detects the signal corresponding to the force indicated by the arrow d in a state in which the detection axis is inclined forward, the angular velocity which is actually produced in the roll direction corresponds to the force indicated by the arrow c. When the angular velocity corresponding to the force indicated by the arrow c is $\omega$, the angular velocity corresponding to the force indicated by the arrow d is $\omega \cos \theta$ and the angular velocity detected by the roll gyro sensor 61 is less than the actual angular velocity. When the roll gyro sensor 61 cannot accurately detect the actual angular velocity, it is not possible to precisely estimate the roll inclined angle and precisely correct the inclination in the roll direction.

Accordingly, in order to accurately detect the angular velocity which is actually produced in the roll direction, the roll gyro sensor 61 is preferably attached to the main body 3 such that the detection axis of the roll gyro sensor 61 is oriented toward the front-back direction and the horizontal or substantially horizontal direction in the balanced state in the pitch direction as in FIG. 12, that is, in a state in which the gravity center G of the main body 3 is disposed on a vertical line crossing the axis of the wheel 2. With this configuration, it is possible to accurately detect the angular velocity which is actually produced in the roll direction in the balanced state in the pitch direction, and to detect the roll angular velocity with a high sensitivity and with a small difference from the actual roll angular velocity even in a state in which the main body 3 swings at a minute angle in the pitch direction with respect to the balanced state in the pitch direction.

Figure 13:
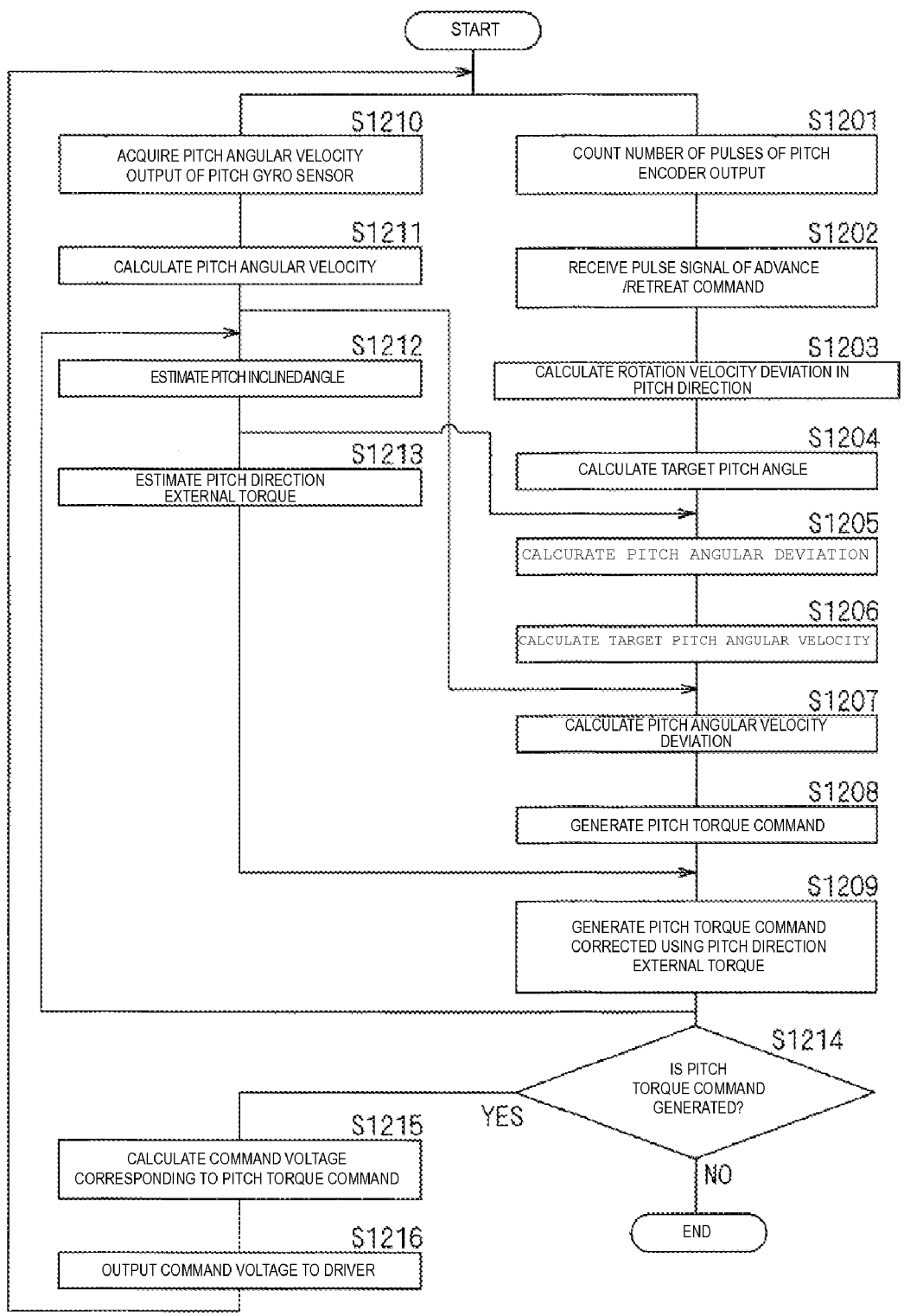
FIG. 13 is a flowchart illustrating falling prevention processing steps in the pitch direction by a controller of a control board of a monocycle robot.

Next, a preferred control operation of the monocycle robot 1 performed by the control block illustrated in FIG. 3 will be described based on the flowchart shown in FIG. 13. For ease of description, a falling prevention control in the pitch direction and a falling prevention control in the roll direction will be separately described. FIG. 13 is a flowchart illustrating falling prevention processing steps in the pitch direction by the controller of the control board 35 of the monocycle robot 1.

As illustrated in FIG. 13, the controller of the control board 35 counts the number of pulses of an output (pulse signal) of the pitch encoder 33 which detects rotation of the pitch motor 32 (step S1201). The controller receives the advance (or retreat) command of the wheel 2 as a pulse signal of the rotation velocity (step S1202).

The controller calculates the rotation velocity deviation in the pitch direction from the number of pulses obtained by subtracting the number of pulses of the output (pulse signal) of the pitch encoder 33 from the number of pulses of the pulse signal of the advance (or retreat) command (step S1203). More specifically, the controller converts the number of pulses resulting from the subtraction into the rotation angle and then differentiates the rotation angle to obtain the rotation velocity deviation. The controller calculates the target pitch angle which is the target inclined angle in the pitch direction, based on the rotation velocity deviation in the pitch direction (step S1204).

The controller subtracts the pitch inclined angle estimated in step S1212 described below from the calculated target pitch angle to calculate a pitch angular deviation (step S1205), and multiplies the calculated pitch angular deviation by a proportional gain to calculate a target pitch angular velocity $\omega_{2p}$ (step S1206).

The controller calculates the pitch angular velocity deviation between the target pitch angular velocity $\omega_{2p}$ and the pitch angular velocity $\omega_{1p}$ calculated in step S1211 described below (step S1207), and generates the pitch torque command $\tau_{0P}$ by, for example, performing PI control of the calculated pitch angular velocity deviation (step S1208).

The controller corrects the generated pitch torque command $\tau_{0P}$ using the pitch direction external torque $\tau_{3P}$ estimated in step S1213 described below, and generates a pitch torque command $\tau_{2p}$ (step S1209).

The controller performs A/D conversion of the output of the pitch angular velocity output from the pitch gyro sensor 31 to acquire the A/D converted output (step S1210). The controller multiplies the acquired output of the pitch angular velocity by a conversion coefficient to calculate a pitch angular velocity $\omega_{1p}$ (step S1211).

Using equation 18, the controller estimates the pitch inclined angle at which the main body 3 is inclined in the pitch direction with respect to the balanced state, from the calculated pitch angular velocity $\omega_{1p}$ and the pitch torque command $\tau_{2p}$ generated in above step S1209 (step S1212). The controller estimates the pitch direction external torque for inclining the main body 3 in the pitch direction, based on the estimated pitch inclined angle (step S1213).

The controller decides whether or not the pitch torque command $\tau_{2p}$ is generated in step S1209 (step S1214).

When the controller decides that the pitch torque command $\tau_{2p}$ is generated (step S1214: YES), the controller multiplies the generated pitch torque command $\tau_{2p}$ by a conversion coefficient to calculate a command voltage (step S1215). The controller performs D/A conversion of the calculated command voltage to output to the driver which drives and rotates the pitch motor 32 (step S1216). The controller returns processing back to step S1201 and step S1210, and repeats the above processing.

In contrast, when the controller decides that the pitch torque command $\tau_{2p}$ is not generated (step S1214: NO), the main body 3 is in the balanced state without receiving an advance/retreat command, and therefore, the controller finishes the processing. Although the processing steps have been described with the above example in which the rotation angle is received as the advance command or the retreat command, even when the rotation velocity is received as the advance command or the retreat command, it is possible to perform falling prevention control according to the same processing steps by obtaining the angular velocity deviation.

Figure 14:
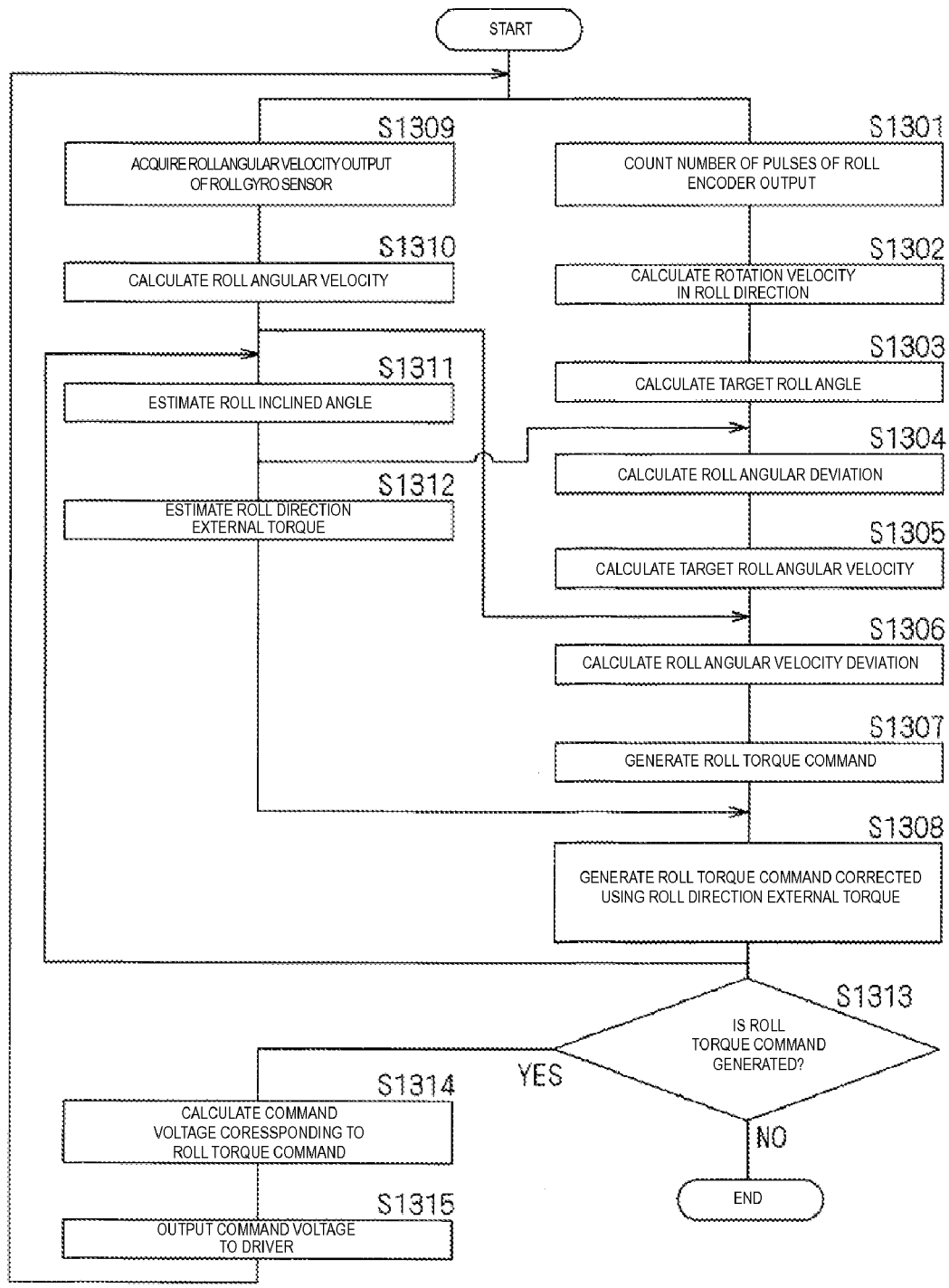
FIG. 14 is a flowchart illustrating falling prevention processing steps in a roll direction by a controller of a control board of a monocycle robot.

FIG. 14 is a flowchart illustrating preferred falling prevention processing steps in the roll direction by the controller of the control board 35 of the monocycle robot 1. As illustrated in FIG. 14, the controller of the control board 35 counts the number of pulses of an output (pulse signal) of the roll encoder 63 which detects a rotation of the roll motor 62 (step S1301).

The controller calculates the rotation velocity in the roll direction based on the counted number of pulses (step S1302). More specifically, the controller converts the counted number of pulses into the rotation angle and then integrates the rotation angle to obtain the rotation velocity. The controller calculates the target roll angle which is the target inclined angle in the roll direction, based on the rotation velocity in the roll direction (step S1303).

The controller subtracts the roll inclined angle estimated in step S1311 described below from the calculated target roll angle to calculate a roll angular deviation (step S1304), and multiplies the calculated roll angular deviation by a proportional gain to calculate a target roll angular velocity $\omega_{2r}$ (step S1305).

The controller calculates the roll angular velocity deviation between the target roll angular velocity $\omega_{2r}$ and the roll angular velocity $\omega_{1r}$ calculated in step S1310 described below (step S1306), and generates the roll torque command $\tau_{0r}$ by, for example, performing PI control of the calculated roll angular velocity deviation (step S1307).

The controller corrects the generated roll torque command $\tau_{0r}$ using the roll direction external torque $\tau_{3r}$ estimated in step S1312 described below, and generates the roll torque command $\tau_{2r}$ (step S1308).

The controller performs A/D conversion of the output of the roll angular velocity output from the roll gyro sensor 61 to acquire the A/D converted output (step S1309). The controller multiplies the acquired output of the roll angular velocity by a conversion coefficient to calculate a roll angular velocity $\omega_{1r}$ (step S1310).

Using equation 25, the controller estimates the roll inclined angle at which the main body 3 is inclined in the roll direction with respect to the balanced state, from the calculated roll angular velocity $\omega_{1r}$ and the roll torque command $\tau_{2r}$ generated in above step S1308 (step S1311). The controller estimates the roll direction external torque to incline the main body 3 in the roll direction, based on the estimated roll inclined angle (step S1312).

The controller decides whether or not the roll torque command $\tau_{2r}$ is generated in step S1308 (step S1313).

When the controller decides that the roll torque command $\tau_{2r}$ is generated (step S1313: YES), the controller multiplies the generated roll torque command $\tau_{2r}$ by a conversion coefficient to calculate a command voltage (step S1314). The controller performs D/A conversion of the calculated command voltage to output to the driver which drives and rotates the roll motor 62 (step S1315). The controller returns processing back to step S1301 and step S1309, and repeats the above processing.

In contrast, when the controller decides that the roll torque command $\tau_{2r}$ is not generated (step S1313: NO), the main body 3 is in the balanced state, and therefore, the controller finishes the processing.

As described above, according to the present preferred embodiment, it is possible to precisely estimate the pitch inclined angle at which the main body is inclined in the pitch direction with respect to the balanced state, and the pitch angular velocity of the pitch angular velocity sensor is not integrated. Therefore a calculation error of the target pitch angle due to the accumulation of a noise and an offset is not produced, so that it is possible to precisely correct the inclination in the pitch direction with respect to the balanced state by utilizing a reaction torque resulting from a rotation of a wheel, and prevent falling in the pitch direction. Further, by receiving an advance or a retreat command of a wheel, and calculating a target pitch angle based on a rotation velocity deviation in the pick direction calculated from the received advance or retreat command and the rotation angle detected in the pitch rotation sensor, it is possible to correct the inclination in the pitch direction while securing the rotation velocity for the commanded movement. Furthermore, it is possible to simplify and miniaturize a falling prevention controlling device with a simple configuration which does not require, for example, an acceleration sensor, and in which only an angular velocity sensor is required in addition to, for example, a motor required to drive a wheel.

Moreover, it is possible to precisely estimate the roll inclined angle at which the main body is inclined in the roll direction with respect to the balanced state, and the roll angular velocity of the roll angular velocity sensor is not integrated. Therefore, a calculation error of the target roll angle due to the accumulation of a noise and an offset is not produced, so that it is possible to precisely correct the inclination in the roll direction with respect to the balanced state by utilizing a reaction torque resulting from a rotation of the inertia rotor and prevent falling in the roll direction.

In addition, preferred embodiments of the present invention can be changed within a range which does not deviate from the scope and spirit of the present invention. The falling prevention controlling device according to preferred embodiments of the present invention may be applied not only to monocycle robots but also to, for example, two-legged walking robots and two-wheeled vehicles which rotate and move in the front-back direction about the one axis in the left-right direction, and can provide substantially the same advantages as those described above.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A falling prevention controlling device comprising:
   a wheel arranged to rotate and move in a front-back direction, and a main body connected to a rotation axis of the wheel and arranged to swing in a pitch direction and a roll direction above the wheel;
   the main body comprising:
      a pitch angular velocity sensor arranged to detect a pitch angular velocity which is an angular velocity of an inclined angle in the pitch direction;
      a pitch motor arranged to rotate the wheel in conjunction with a rotation of the wheel; and
      a pitch rotation sensor arranged to detect a rotation position or a rotation velocity of the pitch motor;
   the falling prevention controlling device being arranged to correct an inclination of the main body in the pitch direction by utilizing a reaction torque resulting from rotation of the wheel, the falling prevention controlling device further comprising:
      an advance/retreat command receiving unit arranged to receive an advance or a retreat command of the wheel;
      a target pitch angle calculating unit arranged to calculate a target pitch angle which is a target inclined angle in the pitch direction, based on a rotation velocity deviation in the pitch direction calculated from the received advance or retreat command and the rotation angle detected in the pitch rotation sensor;
      a pitch inclined angle estimating unit arranged to estimate a pitch inclined angle which is an angle at which the main body is inclined in the pitch direction with respect to a balanced state, from the pitch angular velocity detected in the pitch angular velocity sensor and a pitch torque command generated based on the target pitch angle and given to the pitch motor; and
      a pitch torque command generating unit arranged to generate the pitch torque command based on the target pitch angle and the pitch inclined angle.

2. The falling prevention controlling device according to claim 1, wherein the advance/retreat command receiving unit is arranged to receive the advance or the retreat command of the wheel as a rotation velocity or a rotation angle.

3. The falling prevention controlling device according to claim 1, further comprising:
   a target pitch angular velocity calculating unit arranged to calculate a target pitch angular velocity which is an angular velocity of a target inclined angle in the pitch direction, from a pitch angular deviation obtained by subtracting the pitch inclined angle from the target pitch angle; wherein
   the pitch torque command generating unit is arranged to generate the pitch torque command based on a deviation between the target pitch angular velocity and the detected pitch angular velocity.

4. The falling prevention controlling device according to claim 1, further comprising:
   a pitch direction external torque estimating unit arranged to estimate a pitch direction external torque to incline the main body in the pitch direction, based on the pitch inclined angle; and
   a torque correcting unit arranged to correct the pitch torque command in a direction in which the estimated pitch direction external torque is canceled.

5. The falling prevention controlling device according to claim 1 in which the main body comprises:
   a roll angular velocity sensor arranged to detect a roll angular velocity which is an angular velocity of an inclined angle in the roll direction;
   an inertia rotor arranged to rotate in the roll direction;
   a roll motor arranged to rotate the inertia rotor in conjunction with a rotation of the inertia rotor; and
   a roll rotation sensor arranged to detect a rotation position or a rotation velocity of the roll motor; and
   the falling prevention controlling device comprising:
      a target roll angle calculating unit arranged to calculate a target roll angle which is a target inclined angle in the roll direction, based on the rotation velocity in the roll direction detected in the roll rotation sensor;
      a roll inclined angle estimating unit arranged to estimate a roll inclined angle which is an angle at which the main body is inclined in the roll direction with respect to the balanced state, from the roll angular velocity detected in the roll angular velocity sensor and a roll torque command generated based on the target roll angle and provided to the roll motor;
      a target roll angular velocity calculating unit arranged to calculate a target roll angular velocity which is an angular velocity of a target inclined angle in the roll direction, from a roll angular deviation obtained by subtracting the roll inclined angle from the target roll angle; and
      a roll torque command generating unit arranged to generate the roll torque command based on a deviation between the target roll angular velocity and the detected roll angular velocity.

6. The falling prevention controlling device according to claim 5, wherein a detection axis of the roll angular velocity sensor is oriented in a front-back direction and a horizontal or substantially horizontal direction in a state in which a gravity center of the main body is located on a vertical or substantially vertical line crossing a rotation axis of the wheel.

7. The falling prevention controlling device according to claim 1, wherein a rotation ratio of the rotation of the wheel is less than a rotation of the pitch motor.

8. A non-transitory computer readable medium including a computer program which can be executed by a computer mounted in a falling prevention controlling device comprising:
   a wheel arranged to rotate and move in a front-back direction, and a main body connected to a rotation axis of the wheel and arranged to swing in a pitch direction and a roll direction above the wheel;
   the main body comprising:
      a pitch angular velocity sensor arranged to detect a pitch angular velocity which is an angular velocity of an inclined angle in the pitch direction;

a pitch motor arranged to rotate the wheel in conjunction with a rotation of the wheel; and a pitch rotation sensor arranged to detect a rotation position or a rotation velocity of the pitch motor;

the computer program correcting an inclination of the main body in the pitch direction utilizing a reaction torque resulting from the rotation of the wheel, the computer program causing the computer to function as:

an advance/retreat command receiver to receive an advance or a retreat command of the wheel;

a target pitch angle calculator to calculate a target pitch angle which is a target inclined angle in the pitch direction, based on a rotation velocity deviation in the pitch direction calculated from the received advance or retreat command and the rotation angle detected in the pitch rotation sensor;

a pitch inclined angle estimator to estimate a pitch inclined angle which is an angle at which the main body is inclined in the pitch direction with respect to a balanced state, from the pitch angular velocity detected in the pitch angular velocity sensor and a pitch torque command generated based on the target pitch angle and given to the pitch motor; and a pitch torque command generator to generate the pitch torque command based on the target pitch angle and the pitch inclined angle.

9. The non-transitory computer readable medium according to claim 8, causing the advance/retreat command receiver to function as a receiver to receive the advance or the retreat command of the wheel as a rotation velocity or a rotation angle.

10. The non-transitory computer readable medium according to claim 8, causing the computer to function as a target pitch angular velocity calculator to calculate a target pitch angular velocity which is an angular velocity of a target inclined angle in the pitch direction, from a pitch angular deviation obtained by subtracting the pitch inclined angle from the target pitch angle; wherein the pitch torque command generator is caused to function as a generator to generate the pitch torque command based on a deviation between the target pitch angular velocity and the detected pitch angular velocity.

11. The non-transitory computer readable medium according to claim 8, causing the computer to function as:

a pitch direction external torque estimator to estimate a pitch direction external torque for inclining the main body in the pitch direction, based on the pitch inclined angle; and a torque corrector to correct the pitch torque command in a direction in which the estimated pitch direction external torque is canceled.

12. The non-transitory computer readable medium according to claim 8, wherein the main body further comprises:

a roll angular velocity sensor arranged to detect a roll angular velocity which is an angular velocity of an inclined angle in the roll direction;

an inertia rotor arranged to rotate in the roll direction;

a roll motor arranged to rotate the inertia rotor in conjunction with a rotation of the inertia rotor; and a roll rotation sensor arranged to detect a rotation position or a rotation velocity of the roll motor, the non-transitory computer readable medium causing the computer to function as:

a target roll angle calculator to calculate a target roll angle which is a target inclined angle in the roll direction based on the rotation velocity in the roll direction detected in the roll rotation sensor;

a roll inclined angle estimator to estimate a roll inclined angle which is an angle at which the main body is inclined in the roll direction with respect to the balanced state, from the roll angular velocity detected in the roll angular velocity sensor and a roll torque command generated based on the target roll angle and given to the roll motor;

a target roll angular velocity calculator to calculate a target roll angular velocity which is an angular velocity of a target inclined angle in the roll direction, from a roll angular deviation obtained by subtracting the roll inclined angle from the target roll angle; and a roll torque command generator to generate the roll torque command based on a deviation between the target roll angular velocity and the detected roll angular velocity.

* * * * *